(12) United States Patent
Tombuloglu et al.

(10) Patent No.: US 12,642,197 B1
(45) Date of Patent: Jun. 2, 2026

(54) METHOD FOR ENHANCING CHLOROPHYLL CONCENTRATION IN PLANTS

(71) Applicant: Imam Abdulrahman Bin Faisal University, Dammam (SA)

(72) Inventors: Huseyin Tombuloglu, Dammam (SA); Fatimah Alghofaili, Dammam (SA); Munirah Almessiere, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 19/055,649

(22) Filed: Feb. 18, 2025

(51) Int. Cl.
| | |
|---|---|
| *A01G 22/20* | (2018.01) |
| *A01G 7/04* | (2006.01) |
| *A01G 24/10* | (2018.01) |
| *A01G 31/00* | (2018.01) |

(52) U.S. Cl.
CPC ............ *A01G 22/20* (2018.02); *A01G 7/045* (2013.01); *A01G 24/10* (2018.02); *A01G 31/011* (2025.01)

(58) Field of Classification Search
CPC ...... A01G 31/00; A01G 31/02; A01G 31/008; A01G 31/011; A01G 22/20; A01G 22/00; A01G 27/00; A01G 27/003; A01G 7/045; A01G 9/249
See application file for complete search history.

(56) References Cited

U.S. PATENT DOCUMENTS

| | | | | |
|---|---|---|---|---|
| 6,560,922 | B2 * | 5/2003 | Jarrell | .................... A01G 31/02 47/58.1 R |
| 10,212,940 | B2 * | 2/2019 | Ambrose | ............... A01N 63/20 |

(Continued)

FOREIGN PATENT DOCUMENTS

| | | |
|---|---|---|
| CN | 105565964 A | 5/2016 |
| KR | 10-2602999 B1 | 11/2023 |

OTHER PUBLICATIONS

Katie L. Hayes, et al., "Effects, uptake, and translocation of aluminum oxide nanoparticles in lettuce: A comparison study to phytotoxic aluminum ions", Science of the Total Environment, vol. 719, Jun. 1, 2020, 137393. 10 pages.

(Continued)

*Primary Examiner* — Magdalena Topolski
*Assistant Examiner* — Katherine Anne Kloecker
(74) *Attorney, Agent, or Firm* — Oblon, McClelland, Maier & Neustadt, L.L.P.

(57) ABSTRACT

A method of increasing at least one of the chlorophyll-a concentration and the chlorophyll-b concentration in the leaves of a plant of the genus *Hordeum* which has been hydroponically grown from seed over a 2 to 4 week duration, including germinating the seed at from 20 to 40° C.; transferring the germinated seed into an aqueous hydroponic dispersion having a temperature of from 20 to 40° C. and containing NPs of magnesium aluminate ($MgAl2O4$) having a cubic spinel structure; for the duration of 2 to 4 weeks after transferring, maintaining the aqueous hydroponic dispersion at from 20 to 40° C. under dark period-to-light period cycling; and, for the duration of 2 to 4 weeks after transferring, periodically adding NPs of $MgAl2O4$ having a cubic spinel structure to the aqueous hydroponic dispersion to maintain the concentration of the NPs in the aqueous hydroponic dispersion at from 20 to 200 mg/L.

20 Claims, 32 Drawing Sheets

50

Germinate a seed at a temperature of from about 20 to about 40°C — 52

Transfer the germinated seed into an aqueous hydroponic dispersion having a temperature of from about 20 to about 40 °C — 54

Maintain the aqueous hydroponic dispersion at a temperature of from 20 to about 40 °C and subject the aqueous hydroponic dispersion to dark period-to-light period cycling — 56

Periodically add nanoparticles (NPs) of magnesium aluminate ($MgAl_2O_4$) to the aqueous hydroponic dispersion to maintain the concentration of the NPs in the aqueous hydroponic dispersion at from about 20 to about 200 mg/L, for a duration of about 2 to about 4 weeks after the transfer — 58

(56) References Cited

U.S. PATENT DOCUMENTS

| | | | | |
|---|---|---|---|---|
| 2014/0274706 A1* | 9/2014 | Hyde | ....................... | A01G 7/06 |
| | | | | 504/116.1 |
| 2018/0120186 A1 | 5/2018 | Olkowski et al. | | |
| 2023/0271892 A1 | 8/2023 | An et al. | | |
| 2025/0115530 A1* | 4/2025 | Tombuloglu | ............. | C05G 5/14 |

OTHER PUBLICATIONS

S. M. Alam, "Influence of aluminium on plant growth and mineral nutrition of barley", Communications in Soil Science and Plant Analysis, ISSN: 0010-3624 (Print) 1532-2416 (Online) Journal homepage: http://www.tandfonline.com/lol/icss20 vol. 12. Issue 2, 1881, pp. 121-138, 19 pages.

H. K Jahnavi, et al., "Exploring the diverse applications of sol-gel synthesized CaO: $MgAl_2O_4$ nanocomposite: morphological, photocatalytic, and electrochemical perspectives", Discover Nano, vol. 19, Article 147, 2024, 21 pages.

* cited by examiner

| Element | Weight % |
| --- | --- |
| O K | 41.84 |
| Mg K | 19.89 |
| Al K | 38.27 |

| 10/29/2023 | HV | mag ☐ | WD | ⊢———— 100 µm ————⊣ |
|---|---|---|---|---|
| 9:35:55 AM | 20.00 kV | 1.000 x | 20.8 mm | IRMC |

| 10/29/2023 | HV | mag ☐ | WD | ⊢————50 μm————⊣ |
| 9:38:20 AM | 20.00 kV | 2.000 x | 20.8 mm | IRMC |

| 10/29/2023 | HV | mag ☐ | WD | ├────── 30 μm ──────┤ |
| 9:36:47 AM | 20.00 kV | 4.000 x | 20.8 mm | IRMC |

| SEM MAG: 500 x | SM: RE SOLUTION | | VEGA3 TESCAN |
|---|---|---|---|
| Bt: 8.00 | Det: SE | 50 µm | |
| Time(h:m:s): 08:23:47 | VEGA3 LMU | | IRMC-SEM |

| SEM MAG: 1.00 kx | SM: RE SOLUTION | | VEGA3 TESCAN |
|---|---|---|---|
| Bt: 8.00 | Det: SE | 20 µm | |
| Time(h:m:s): 08:24:14 | VEGA3 LMU | | IRMC-SEM |

| SEM MAG: 2.00 kx | SM: RE SOLUTION | | VEGA3 TESCAN |
|---|---|---|---|
| Bt: 8.00 | Det: SE | 20 μm | |
| Time(h:m:s): 08:24:40 | VEGA3 LMU | | IRMC-SEM |

| SEM MAG: 2.00 kx | SM: RE SOLUTION | | VEGA3 TESCAN |
| --- | --- | --- | --- |
| Bt: 8.00 | Det: SE | 20 µm | |
| Time(h:m:s): 08:27:04 | VEGA3 LMU | | IRMC-SEM |

| SEM MAG: 500 x | SM: RE SOLUTION | | VEGA3 TESCAN |
|---|---|---|---|
| Bt: 8.00 | Det: SE | 50 μm | |
| Time(h:m:s): 08:39:33 | VEGA3 LMU | | IRMC-SEM |

| SEM MAG: 1.00 kx | SM: RE SOLUTION | | VEGA3 TESCAN |
|---|---|---|---|
| Bt: 8.00 | Det: SE | 20 μm | |
| Time(h:m:s): 08:40:08 | VEGA3 LMU | | IRMC-SEM |

METHOD FOR ENHANCING CHLOROPHYLL CONCENTRATION IN PLANTS

BACKGROUND

Technical Field

The present disclosure is directed to a method for increasing the chlorophyll concentration in the leaves of a plant of the genus *Hordeum* and, more particularly, relates to a method of enhancing chlorophyll-a and chlorophyll-b concentrations in the leaves of said plant by hydroponically growing the plant in an aqueous dispersion comprising nanoparticles (NPs).

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Nanoparticles (NPs), known for their enhanced physico-chemical, magnetic, optical, and mechanical properties, are widely used in textiles, laser imaging, and biosensors. The implementation of nanotechnology offers a promising solution for sustainable agriculture and has gained significant interest in sectors related to environmental, food and energy policy [See: Vijayakumar, M. D. et al, *Evolution and recent scenario of nanotechnology in agriculture and food industries, Journal of Nanomaterials* (2022)]. Nanotechnology offers transformative potential in agriculture through the use of nanomaterials, such as nanofertilizers, to enhance nutrient delivery, minimize waste, and reduce environmental impact. Further, NPs may enhance the ability of plants to resist both abiotic and biotic stresses, may improve the nutritional quality of crops, may optimize soil mineral composition, and may facilitate more efficient absorption of various nutrients by plants [See: Camara, A. and researchers, *Deep venous thrombosis during tuberculosis cases of* 19-*year guinean, Cardiovascular System,* 7 (1), 2019].

While interest in NPs has thus surged in recent decades, attention is increasingly being directed toward assessing the environmental impact and ecological risks associated with synthetic NPs, with an emphasis on the need for sustainable approaches to the use of NPs/See: Kah, M., et al., *Nano-enabled strategies to enhance crop nutrition and protection, Nature Nanotechnology,* 14 (6): 532-540, 2019].

Nanostructured alumina-characterized by its high surface area, thermal stability, small particle size, durability, adsorption capacity, and porosity-holds promise for various commercial and industrial applications [See: Said, S., et al., *Recent processes for the production of alumina nano-particles, Materials Science for Energy Technologies,* 3:344-363 (2020)]. Aluminum oxide ($Al_2O_3$) NPs (Al-NPs) have been extensively utilized in several fields such as medicine, agriculture, and commercial production. Al-NPs are frequently encountered in drug delivery systems, personal care products, tissue engineering and cosmetics [See: Poborilova, Z., et al., *Toxicity of aluminium oxide nanoparticles demonstrated using a BY-2 plant cell suspension culture model, Environmental and Experimental Botany,* 91:1-11 (2013)]. Additionally, Al-NPs boost plant development and growth. After entering plant tissues through absorption and translocation, NPs bioaccumulate in the plant's aerial and edible parts. This accumulation raises the risk of NPs cycling in ecosystems at various trophic levels. Nevertheless, an excessive concentration of NPs in plant tissues can have a detrimental impact on the rate of transpiration, as well as reducing the rate of photosynthesis, germination, total biomass, and ultimately the yield and quality of crops [See: Rico, C. M., et al., *Chemistry, biochemistry of nanoparticles, and their role in antioxidant defense system in plants, Nanotechnology and Plant Sciences* (2015)].

NPs have shown promise as fertilizers, in enhancing plant growth by improving photosynthetic activity, promoting root and shoot development, increasing antioxidant responses, or boosting chlorophyll concentration. Effective methods of fertilization involve incorporating NPs into soil or hydroponic systems at controlled concentrations to optimize nutrient delivery and improve plant resilience, addressing plant nutrition deficiencies. However, the impact of NPs varies both with dosage and plant species. While low concentrations typically stimulate growth, high concentrations may inhibit development and induce genetic changes. Potential adverse effects include the transport of NPs to edible plant parts and their horizontal transfer through the food chain, raising concerns about their safety for animals and humans. Thus, despite their advantages, concerns about the environmental release and ecological impact of NPs remain. Subsequently, comprehensive analysis is necessary to assess long-term effects and ensure the safe, sustainable use of NPs in agriculture.

Accordingly, one object of the present disclosure is to provide a method of increasing chlorophyll concentration in plants, that may circumvent the drawbacks and limitations such as environmental impact, toxicity at higher concentrations, and potential risks to non-target organisms, as known in the art.

SUMMARY

In an exemplary embodiment, a method of increasing at least one of the chlorophyll-a concentration and the chlorophyll-b concentration in the leaves of a plant of the genus *Hordeum* which has been hydroponically grown from seed over a duration of from about 2 weeks to about 4 weeks is described. The method comprises: germinating the seed at a temperature of from about 20 degrees Celsius (C) to about 40° C.; transferring the germinated seed into an aqueous hydroponic dispersion having a temperature of from about 20° C. to about 40° C., wherein the aqueous hydroponic dispersion includes NPs of magnesium aluminate ($MgAl_2O_4$) at a concentration of from about 20 milligrams per liter (mg/L) to about 200 mg/L and further wherein the $MgAl_2O_4$ has a cubic spinel structure, as determined by X-ray diffraction (XRD); for the duration of about 2 weeks to about 4 weeks after the transferring, maintaining the aqueous hydroponic dispersion at a temperature of from about 20° C. to about 40° C. and subjecting the aqueous hydroponic dispersion to dark period-to-light period cycling, wherein each dark period is of x hours (h), each light period is of (24-x) h and x is from about 6 hours to about 12 hours; and, for the duration of about 2 weeks to about 4 weeks after the transferring, periodically adding nanoparticles (NPs) of $MgAl_2O_4$ to the aqueous hydroponic dispersion to maintain the concentration of the NPs in the aqueous hydroponic dispersion at from about 20 mg/L to about 200 mg/L. The periodically added $MgAl_2O_4$ has a cubic spinel structure, as determined by XRD.

In some embodiments, the plant is selected from the group consisting of *Hordeum vulgare, Hordeum spontaneum, Hordeum jubatum, Hordeum pussilum, Hordeum bulbosum, Hordeum murimim, Hordeum deficiens, Hordeum distichon, Hordeum hexastichon, Hordeum zeocriton, Hordeum trifurcatum, Hordeum* intermedium, and combinations thereof.

In some embodiments, the plant is *Hordeum vulgare*.

In some embodiments, the method further comprises priming the seed prior to the germinating thereof. The priming includes the controlled hydration of the seed to induce pre-germination metabolic processes in the seed.

In some embodiments, the germinating includes at least one process selected from the group including soil planting the seed, disposing the seed on a water-impregnated material, water soaking of the seed, stratification of the seed, and scarification of the seed.

In some embodiments, the germinating includes disposing the seed on a water-absorbent material which permits the penetration of the root of the sprouting seed and impregnating the material with water.

In some embodiments, the seed is germinated at a temperature of from about 25° C. to about 35° C.

In some embodiments, the nanoparticles (NPs) of magnesium aluminate ($MgAl_2O_4$) have a median particle diameter (Dv50) of from about 10 nanometer (nm) to about 40 nm, as determined by transmission electron microscopy (TEM).

In some embodiments, the NPs of $MgAl_2O_4$ have a Dv50 of from about 10 nm to about 30 nm, as determined by TEM.

In some embodiments, the NPs of $MgAl_2O_4$ have a Dv90 particle diameter of less than about 50 nm, as determined by TEM.

In some embodiments, the NPs of $MgAl_2O_4$ have a sphericity of at least about 0.4.

In some embodiments, the aqueous hydroponic dispersion into which the germinated seeds are transferred includes NPs of $MgAl_2O_4$ at a concentration of from about 30 milligrams per liter (mg/L) to about 150 mg/L.

In some embodiments, the aqueous hydroponic dispersion into which the germinated seeds are transferred includes NPs of $MgAl_2O_4$ at a concentration of from about 30 mg/L to about 120 mg/L.

In some embodiments, the aqueous hydroponic dispersion into which the germinated seeds are transferred includes NPs of $MgAl_2O_4$ at a concentration of from about 30 mg/L to about 90 mg/L.

In some embodiments of the method, upon transferring the germinated seed, the aqueous hydroponic dispersion is subjected to sonication to obviate aggregation of the NPs of $MgAl_2O_4$.

In some embodiments, for the duration of about 2 weeks to about 4 weeks after the transferring, the hydroponic dispersion is maintained at a temperature of from about 20° C. to about 30° C.

In some embodiments, for the duration of about 2 weeks to about 4 weeks after the transferring, the hydroponic dispersion is maintained in an environment having a controlled relative humidity of from about 50% to about 80%.

In some embodiments of the dark period-to-light period cycling, x is from about 6 to about 10.

In some embodiments of the dark period-to-light period cycling, x is from about 7 to about 9.

In some embodiments, the aqueous dispersion is subjected to sonication after each periodic addition of the NPs of $MgAl_2O_4$ in order to obviate the aggregation thereof.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

upon three weeks of $MgAl_2O_4$ NPs treatment at concentrations ranging from 50 mg/L to 400 mg/L, according to certain embodiments.

Figure 4A:
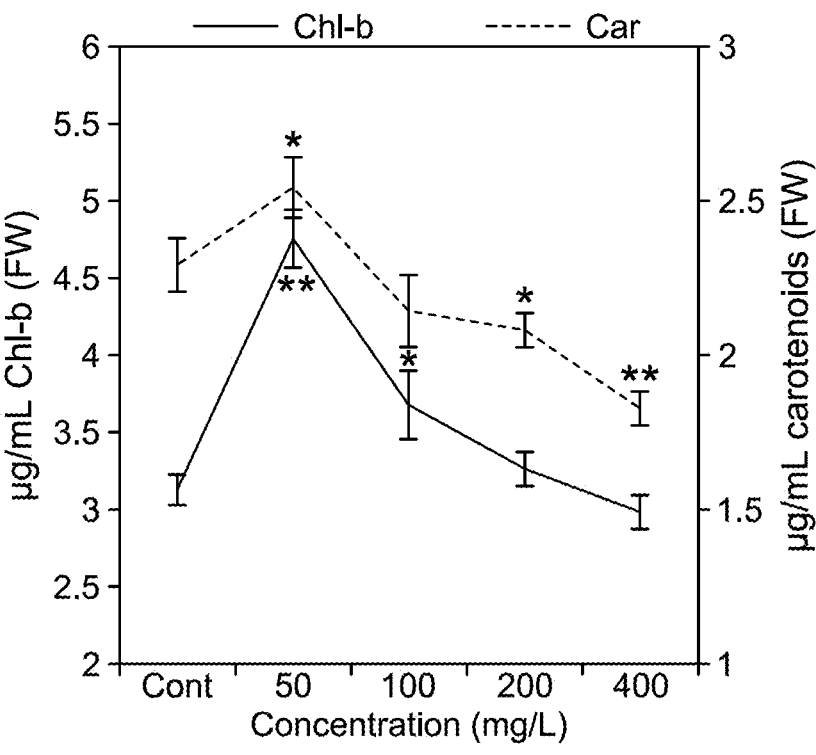
FIG. 4A shows a graph for photosynthetic parameters of chlorophyll-b and carotenoid pigments upon three weeks of $MgAl_2O_4$ NPs treatment at concentrations ranging from 50 mg/L to 400 mg/L, according to certain embodiments.
Figure 4B:
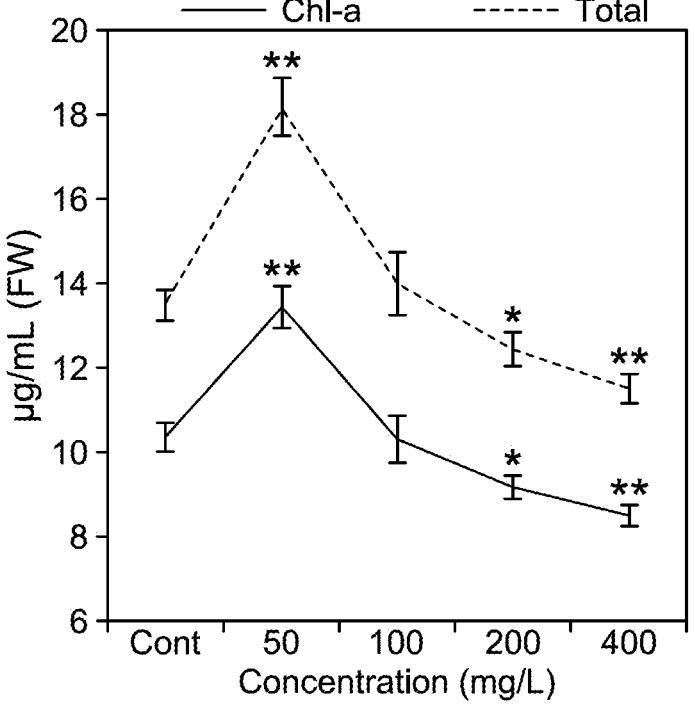
FIG. 4B shows a graph for photosynthetic parameters of chlorophyll-a and carotenoid pigments upon three weeks of $MgAl_2O_4$ NPs treatment at concentrations ranging from 50 mg/L to 400 mg/L, according to certain embodiments.
Figure 4C:
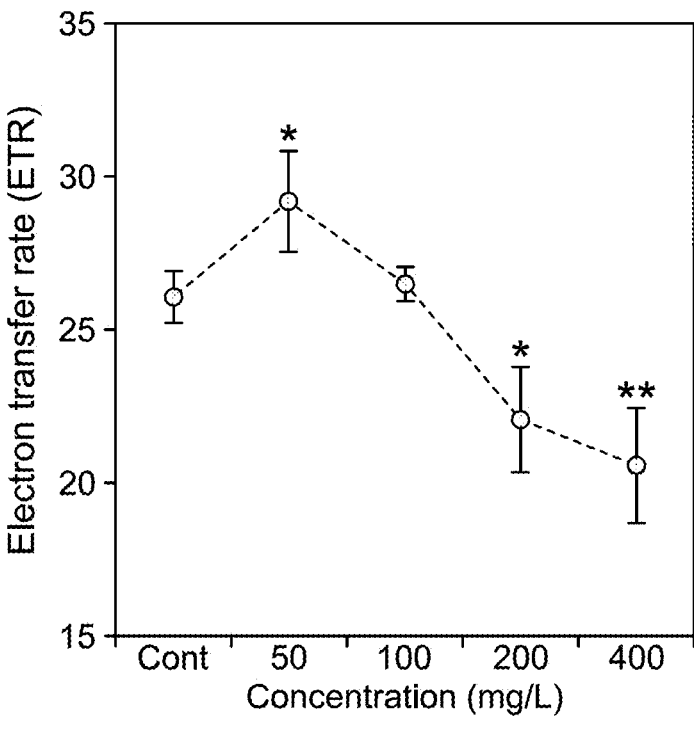
FIG. 4C shows the electron transfer rate (ETR) upon three weeks of $MgAl_2O_4$ NPs treatment at concentrations ranging from 50 mg/L to 400 mg/L, according to certain embodiments.
Figure 4D:
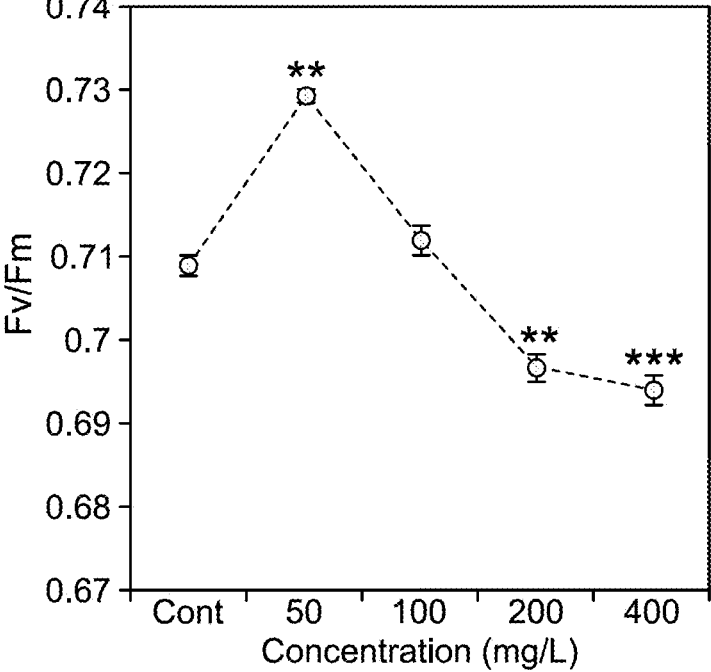
FIG. 4D shows the maximal quantum efficiency of maximal quantum efficiency of photosystem II (PSII (Fv/Fm))
Figure 4E:
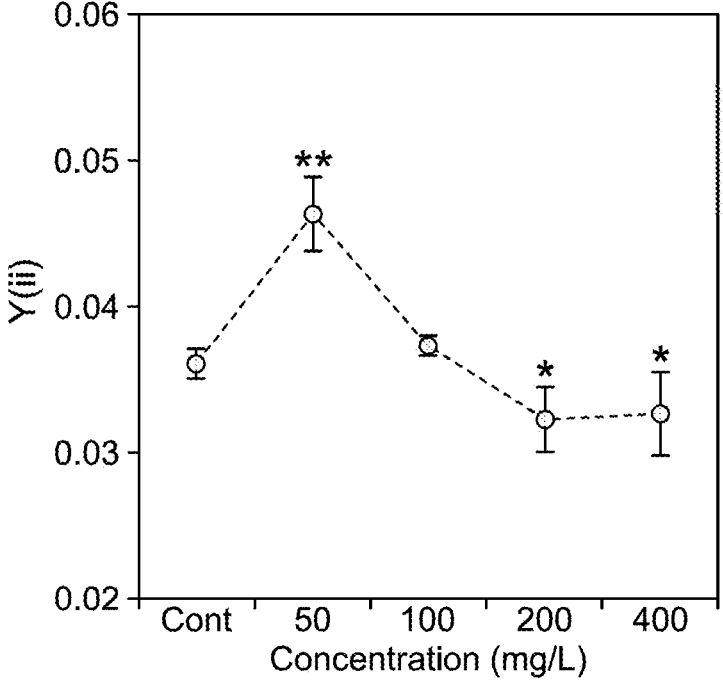

FIG. 4E shows the effective photochemical quantum yield of photosystem II (Y(II)) upon three weeks of $MgAl_2O_4$ NPs treatment at concentrations ranging from 50 mg/L to 400 mg/L, according to certain embodiments.

Figure 5A:

FIG. 5A shows a confocal microscopy analysis of the plant root tips (0.5 cm in length) unexposed (control) to $MgAl_2O_4$ NPs, according to certain embodiments.

Figure 5B:
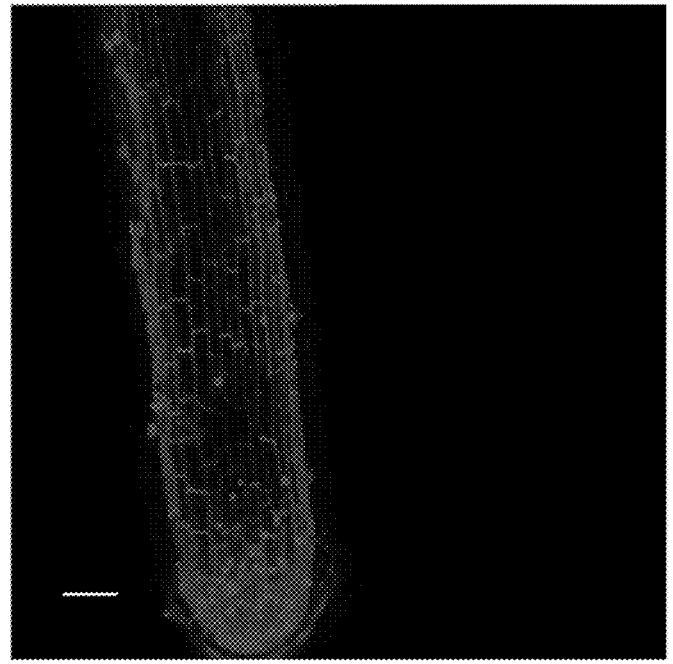

FIG. 5B shows a confocal microscopy analysis of plant root tips (0.5 cm in length) treated with a 50 mg/L concentration of $MgAl_2O_4$ NPs, according to certain embodiments.

Figure 5C:
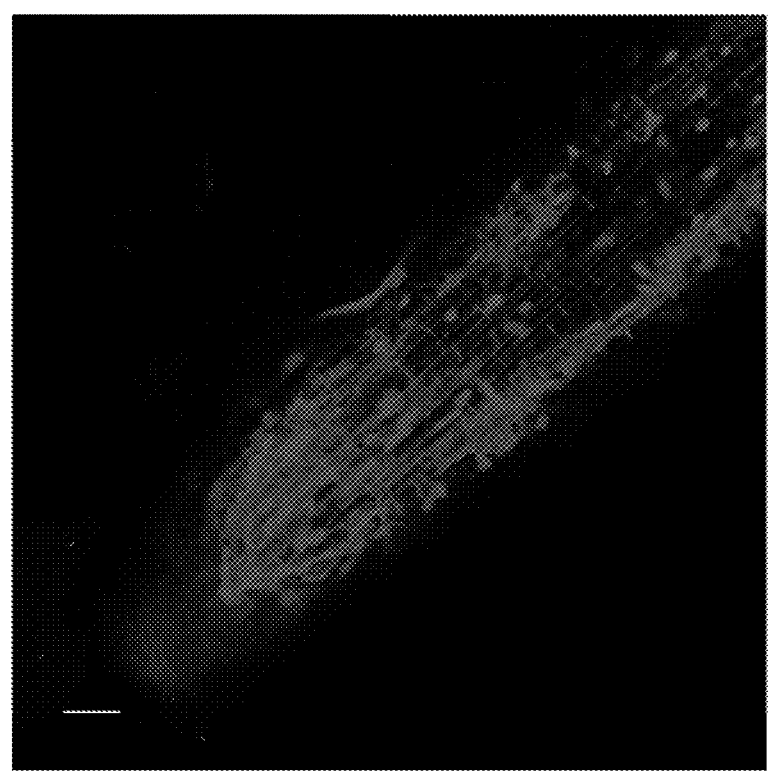

FIG. 5C shows a confocal microscopy analysis of plant root tips (0.5 cm in length) treated with a 100 mg/L concentration of $MgAl_2O_4$ NPs, according to certain embodiments.

Figure 5D:
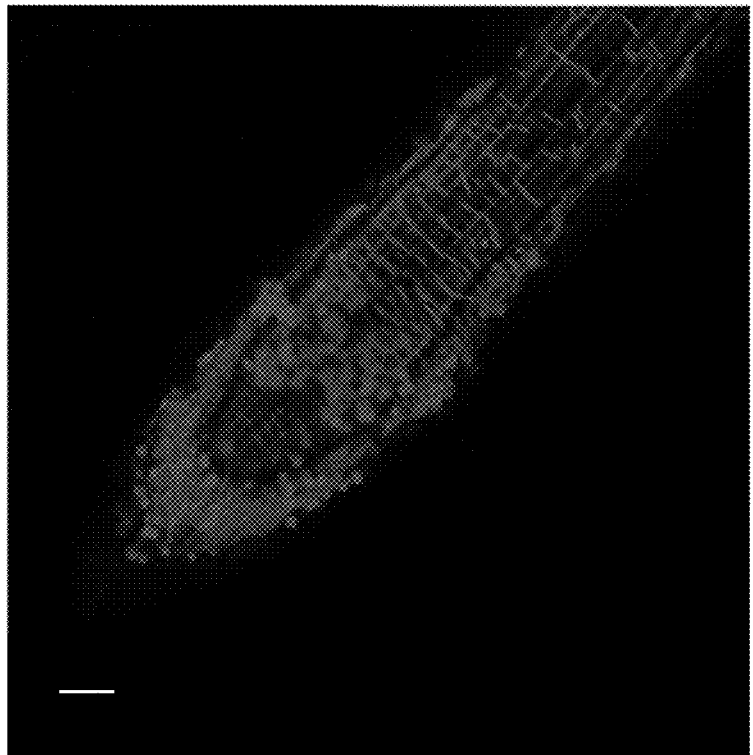

FIG. 5D shows a confocal microscopy analysis of plant root tips (0.5 cm in length) treated with a 200 mg/L concentration of $MgAl_2O_4$ NPs, according to certain embodiments.

Figure 5E:
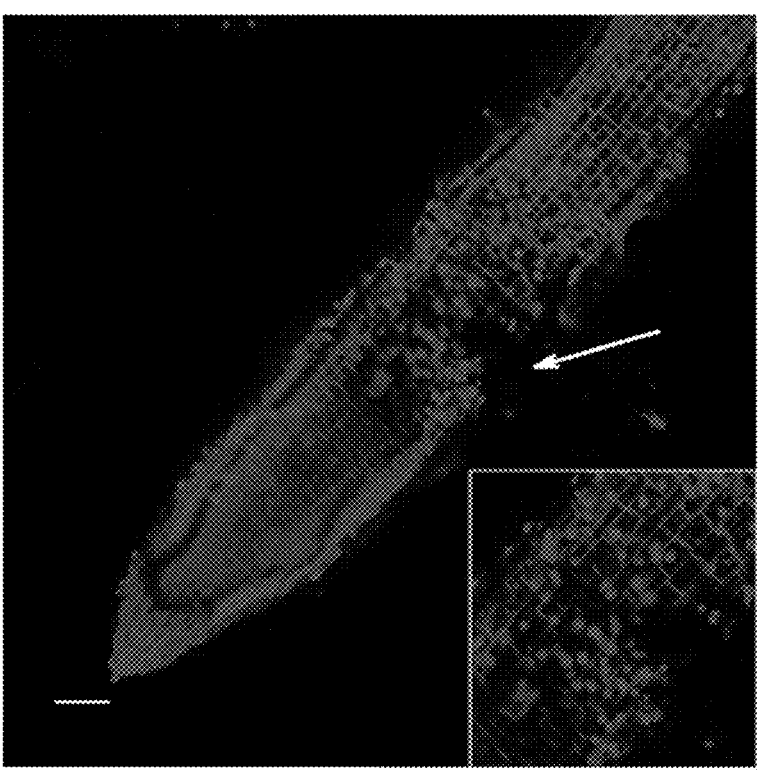

FIG. 5E shows a confocal microscopy analysis of plant root tips (0.5 cm in length) treated with a 400 mg/L concentration of $MgAl_2O_4$ NPs, according to certain embodiments.

Figure 5F:
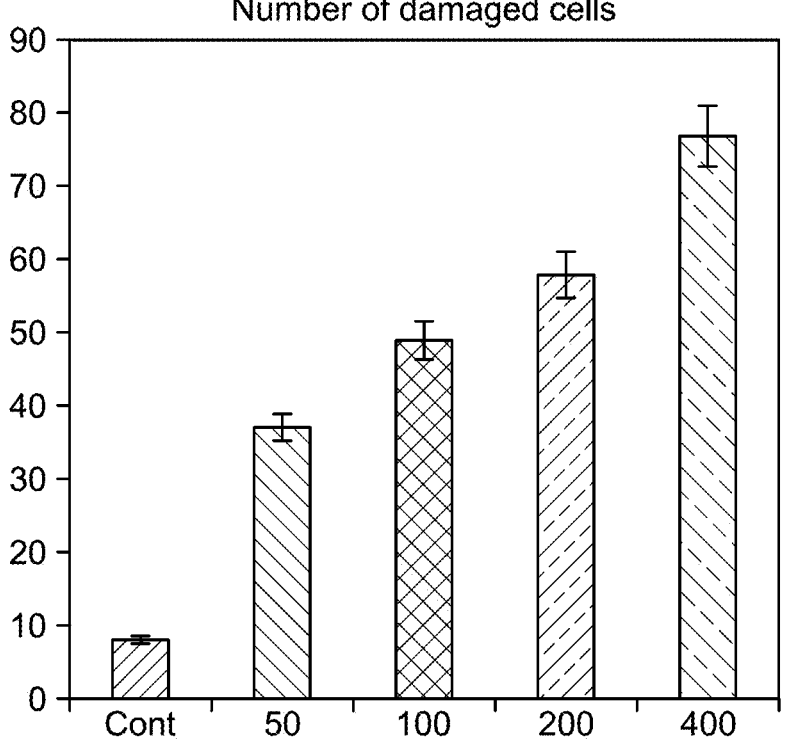

FIG. 5F shows a column graph for the number of damaged cells against increasing NPs concentrations, according to certain embodiments.

Figure 6A:
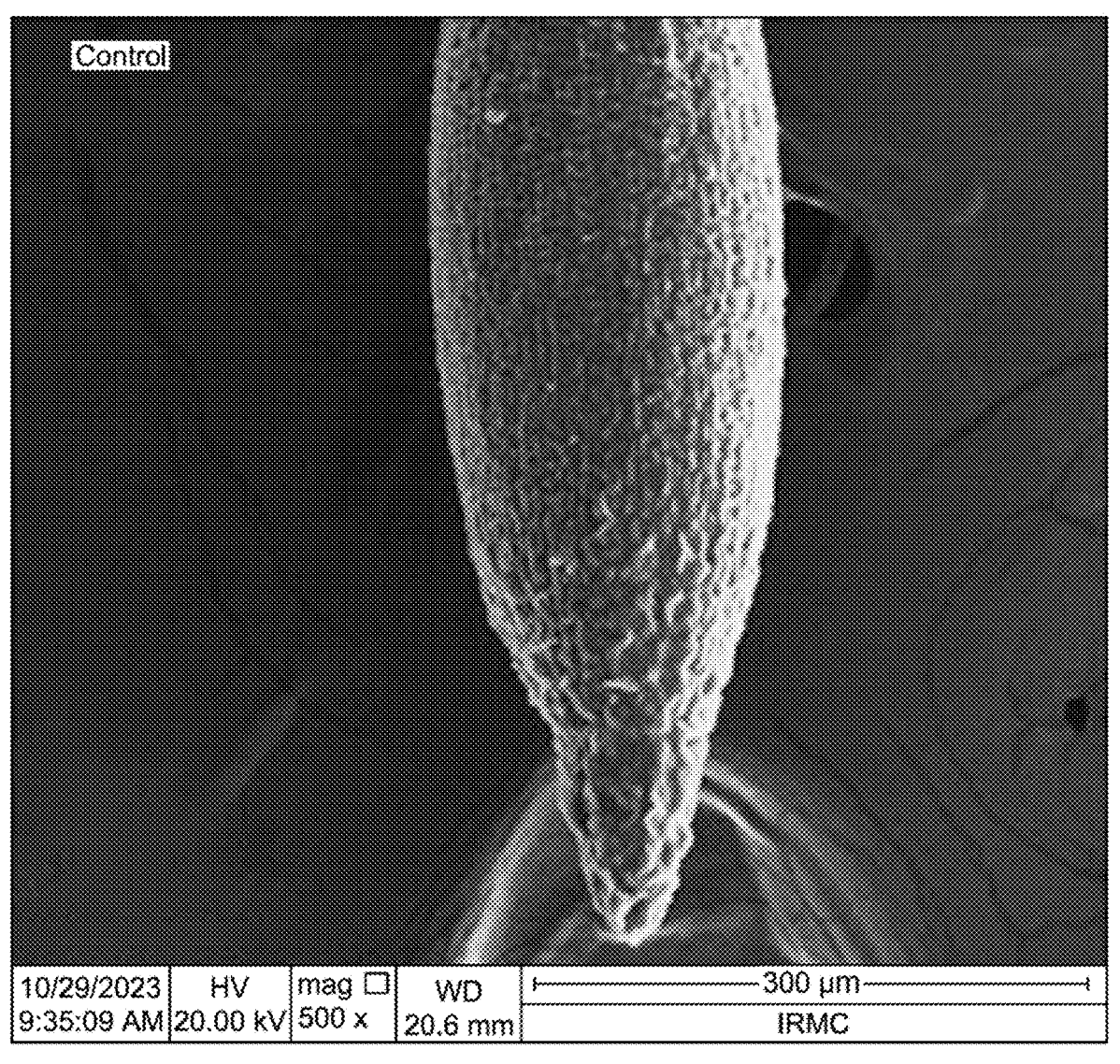

FIG. 6A shows a SEM image of unexposed (control) at a resolution of 300 μm, according to certain embodiments.

Figure 6B:
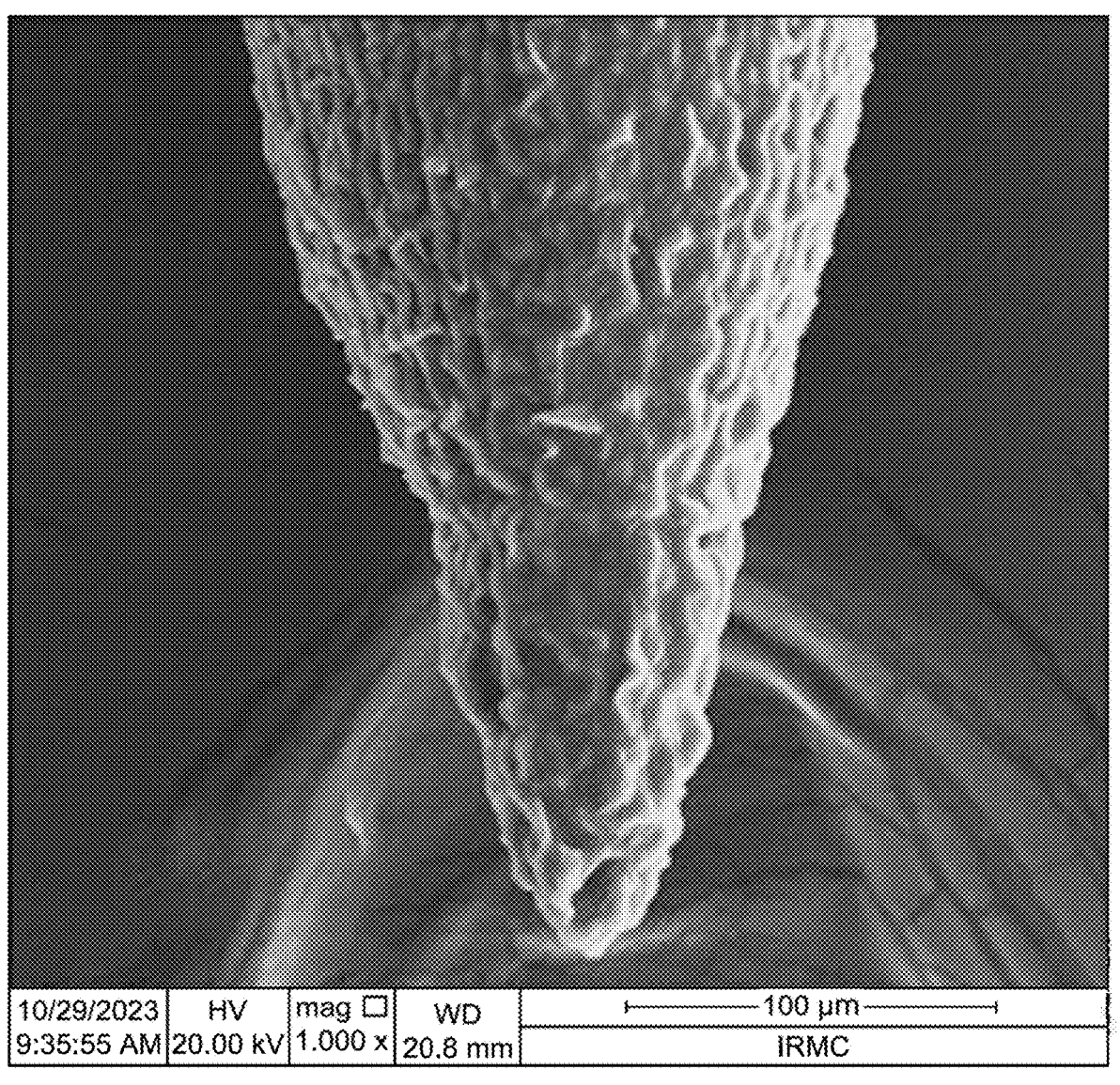

FIG. 6B shows a SEM image of unexposed (control) at a resolution of 100 μm, according to certain embodiments.

Figure 6C:
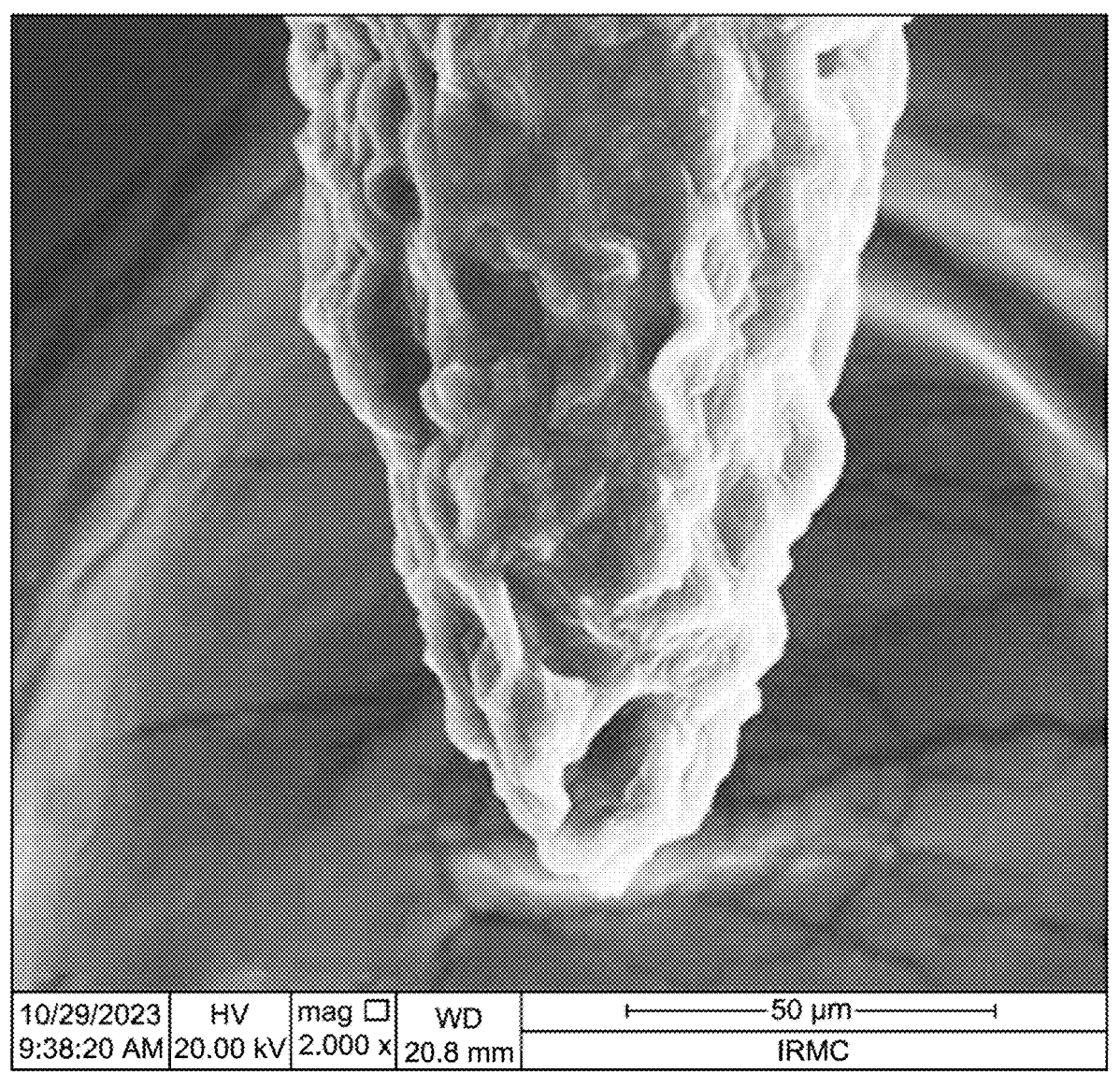

FIG. 6C shows a SEM image of unexposed (control) at a resolution of 50 μm, according to certain embodiments.

Figure 6D:
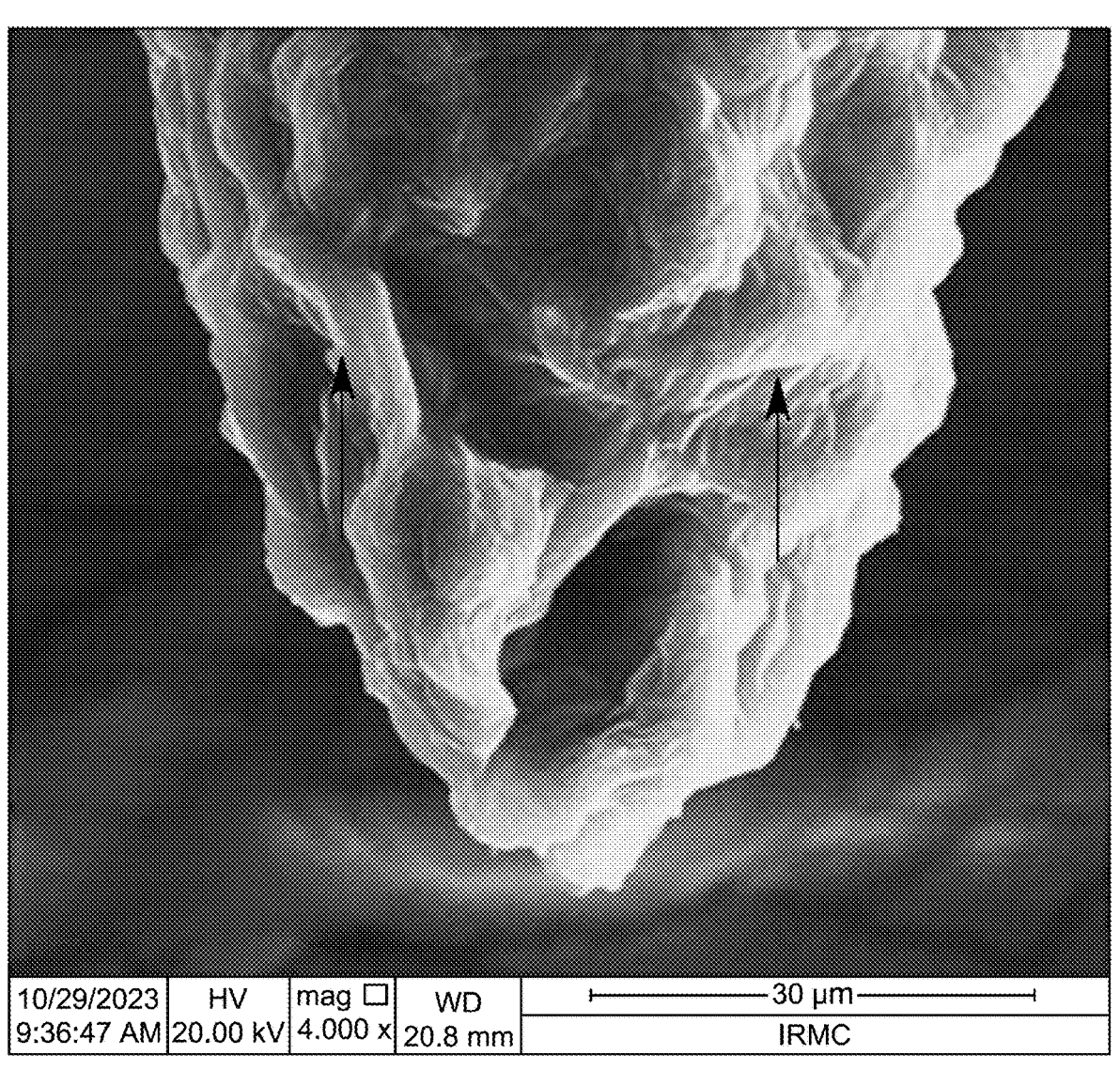

FIG. 6D shows a SEM image of unexposed (control) at a resolution of 30 μm, according to certain embodiments.

Figure 6E:
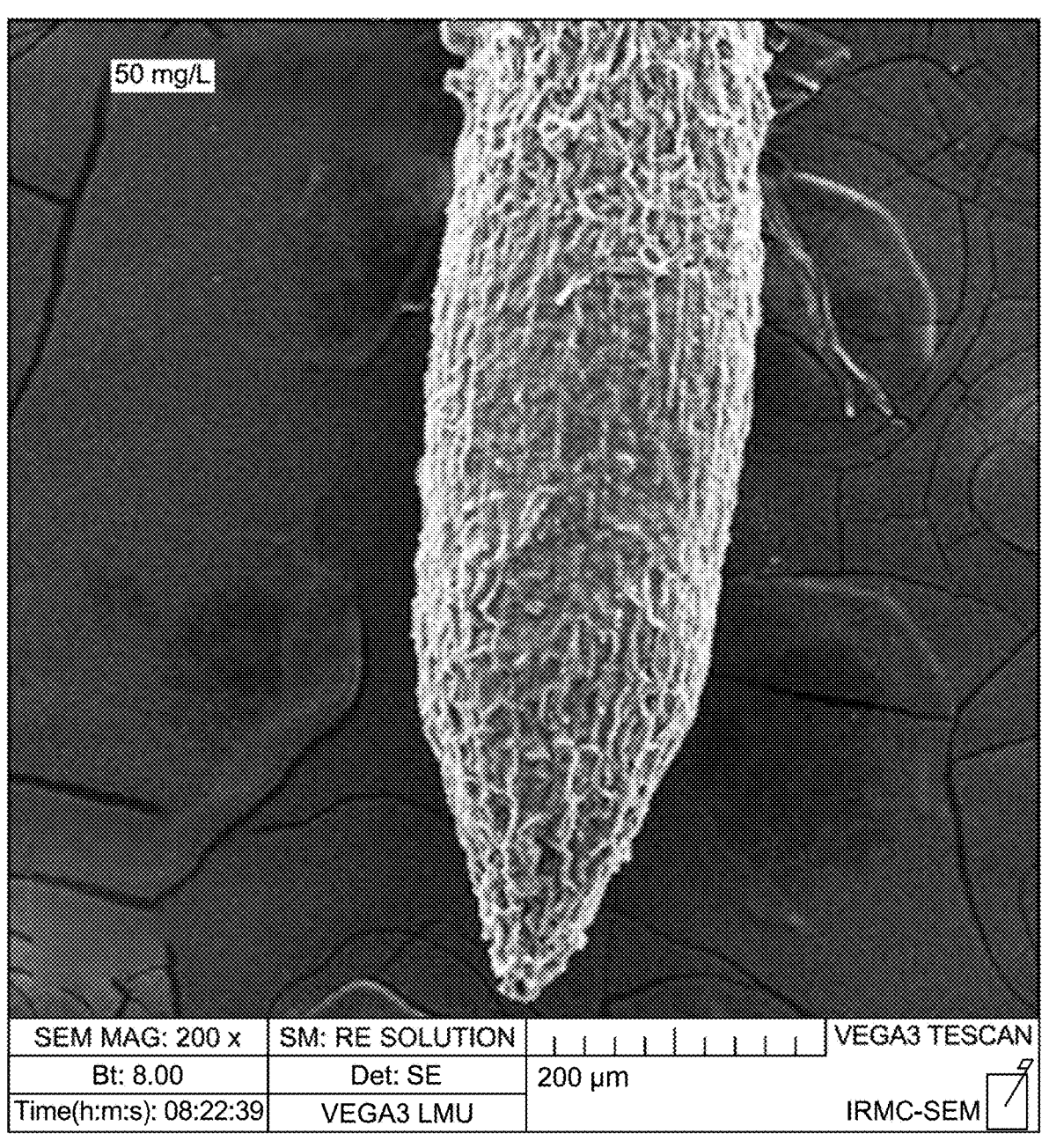

FIG. 6E shows a SEM image of $MgAl_2O_4$ NPs treated root with 50 mg/L concentration at a resolution of 200 μm, according to certain embodiments.

Figure 6F:
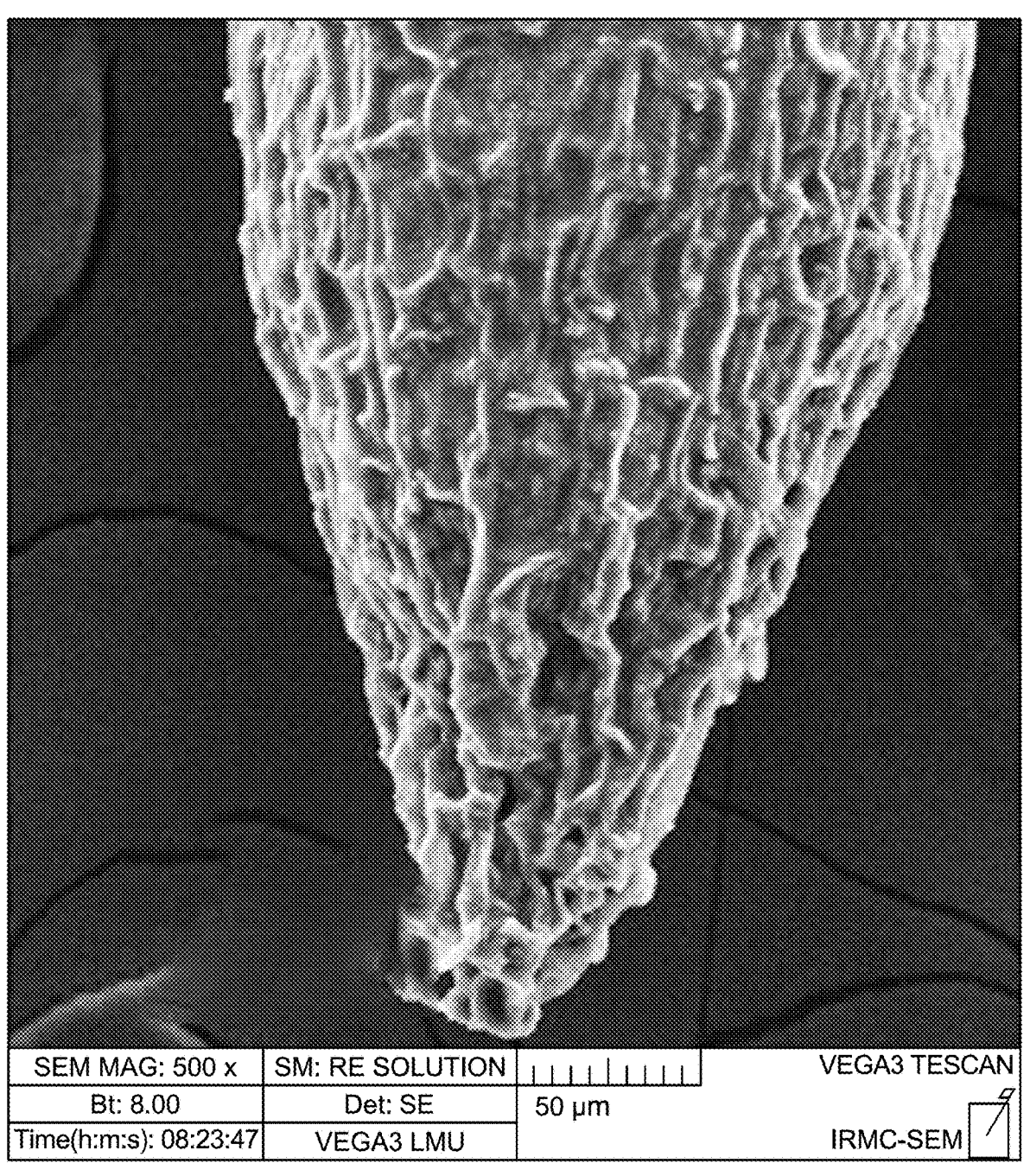

FIG. 6F shows a SEM image of $MgAl_2O_4$ NPs treated root with 50 mg/L concentration at a resolution of 50 μm, according to certain embodiments.

Figure 6G:
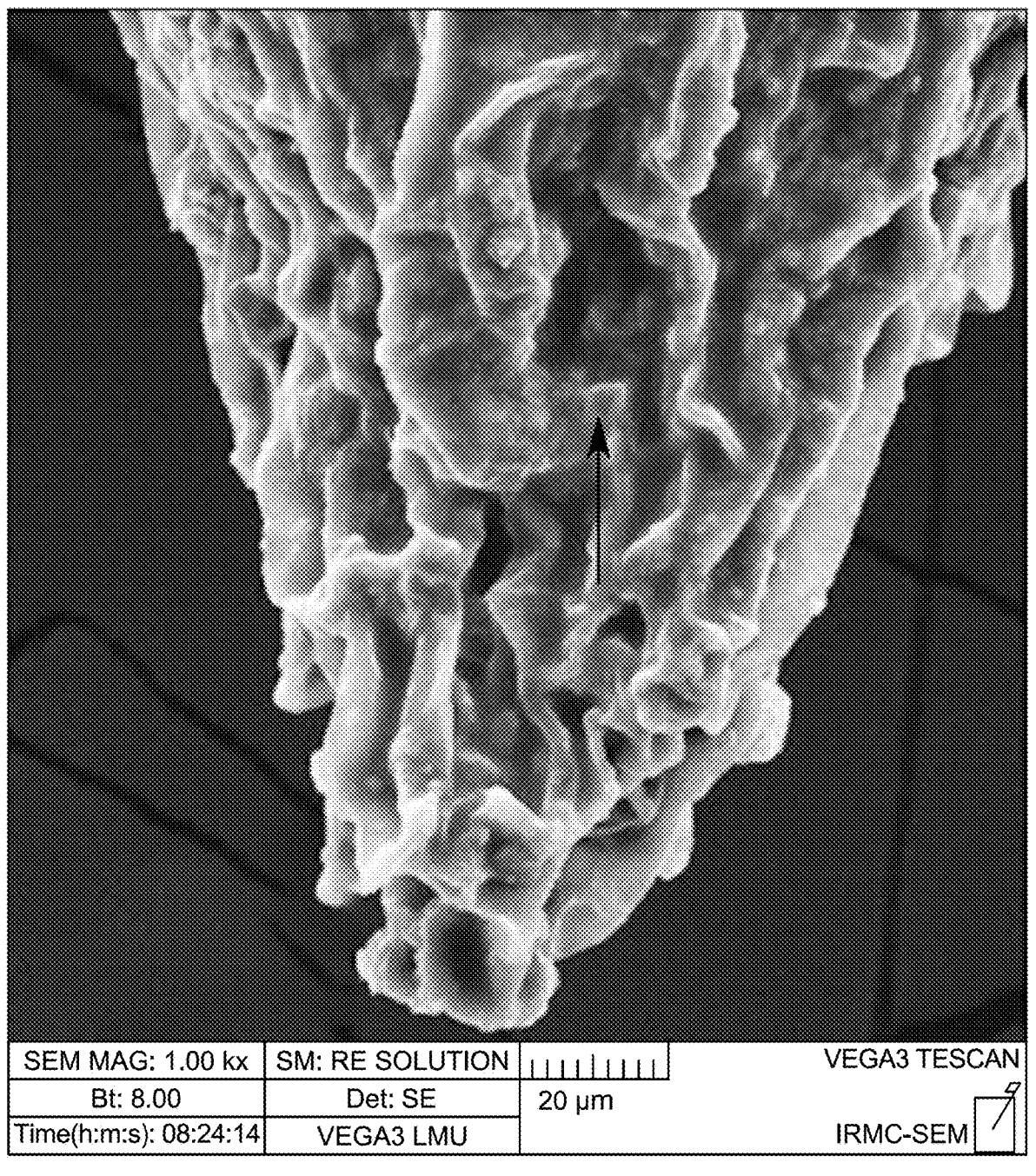

FIG. 6G shows a SEM image of $MgAl_2O_4$ NPs treated root with 50 mg/L concentration at a resolution of 20 μm, according to certain embodiments.

Figure 6H:
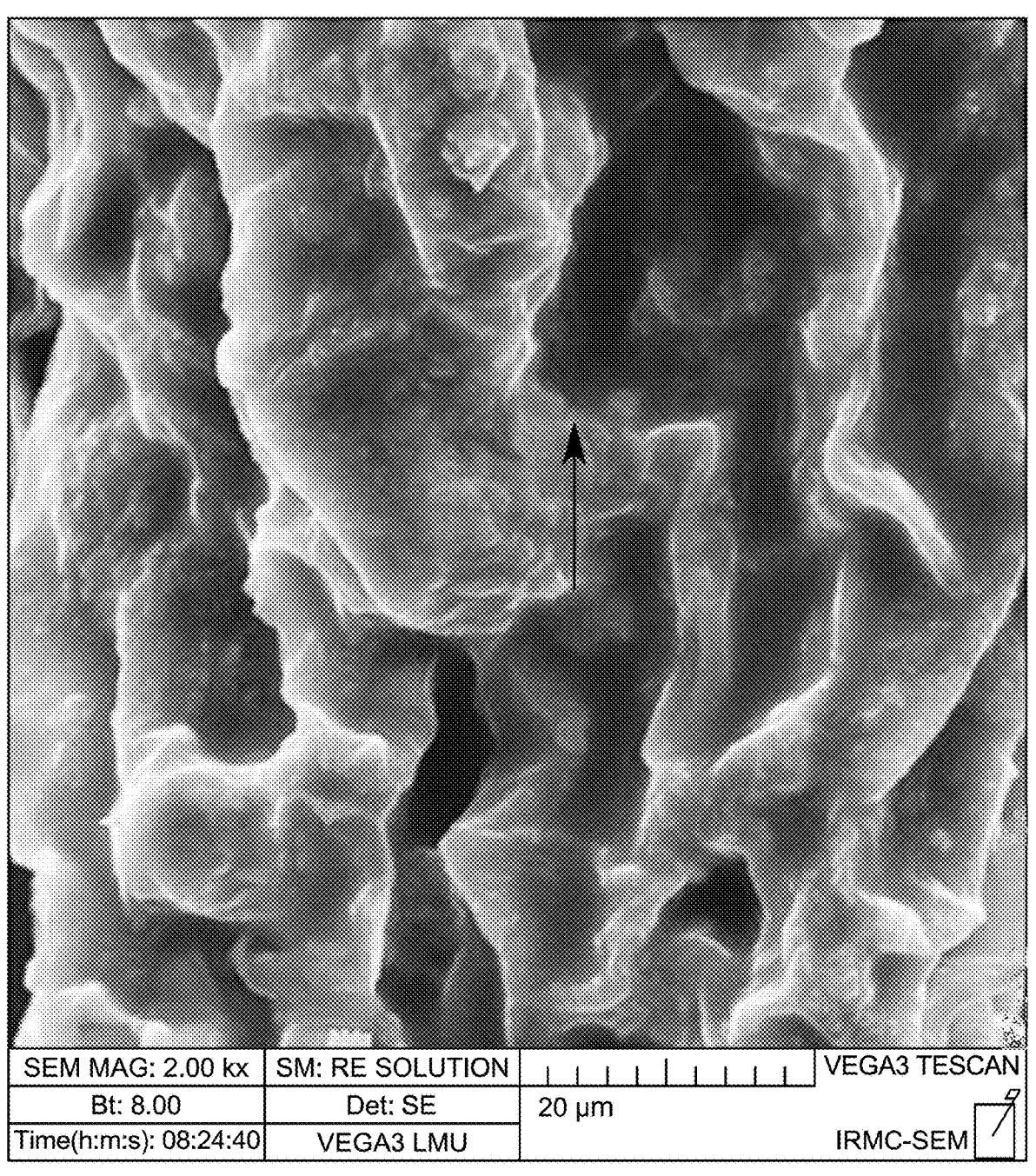

FIG. 6H shows a further SEM image of $MgAl_2O_4$ NPs treated root with 50 mg/L concentration at a resolution of 20 μm, according to certain embodiments.

Figure 6I:
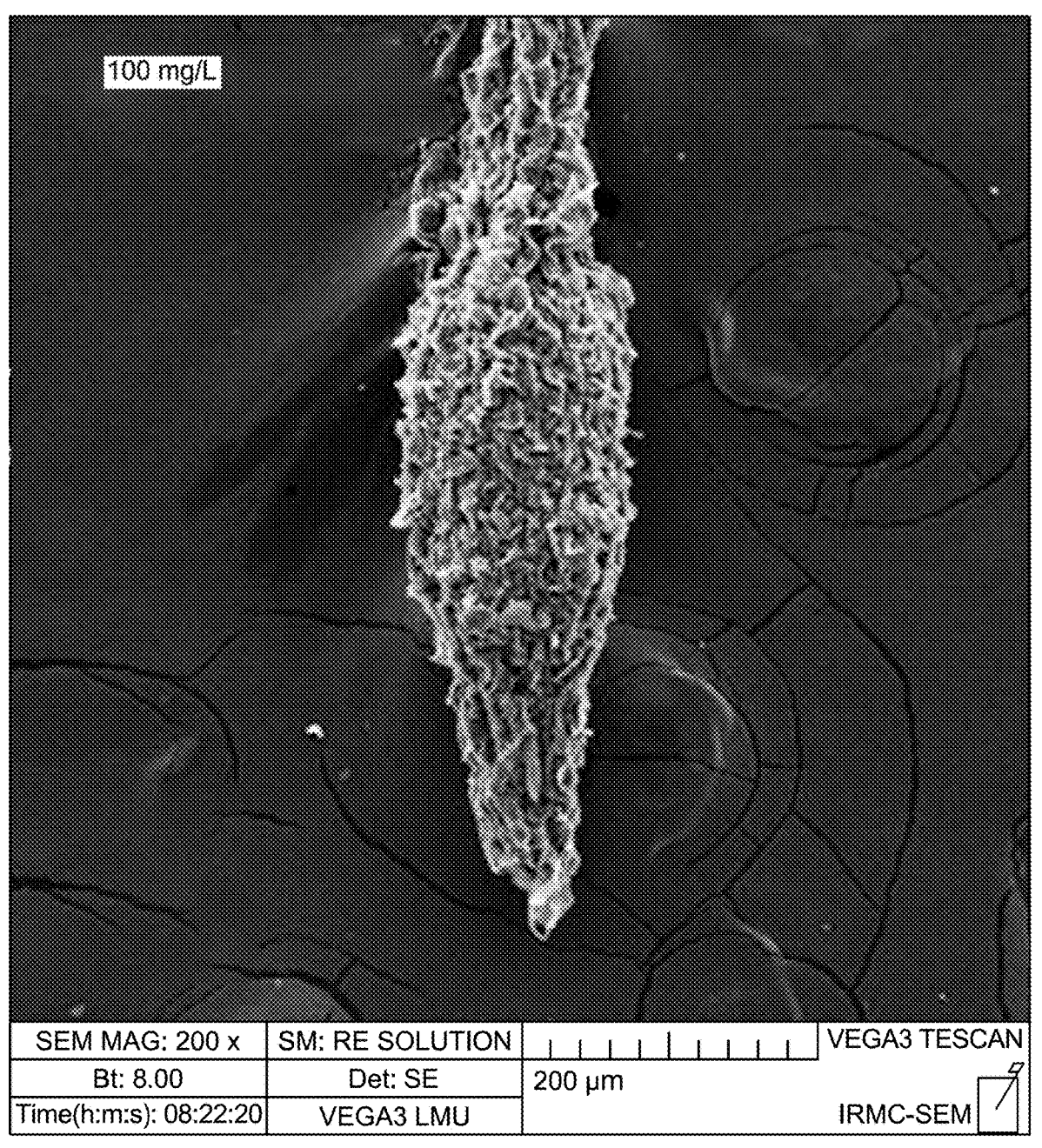

FIG. 6I shows a SEM image of $MgAl_2O_4$ NPs treated root with 100 mg/L concentration at a resolution of 200 μm, according to certain embodiments.

Figure 6J:
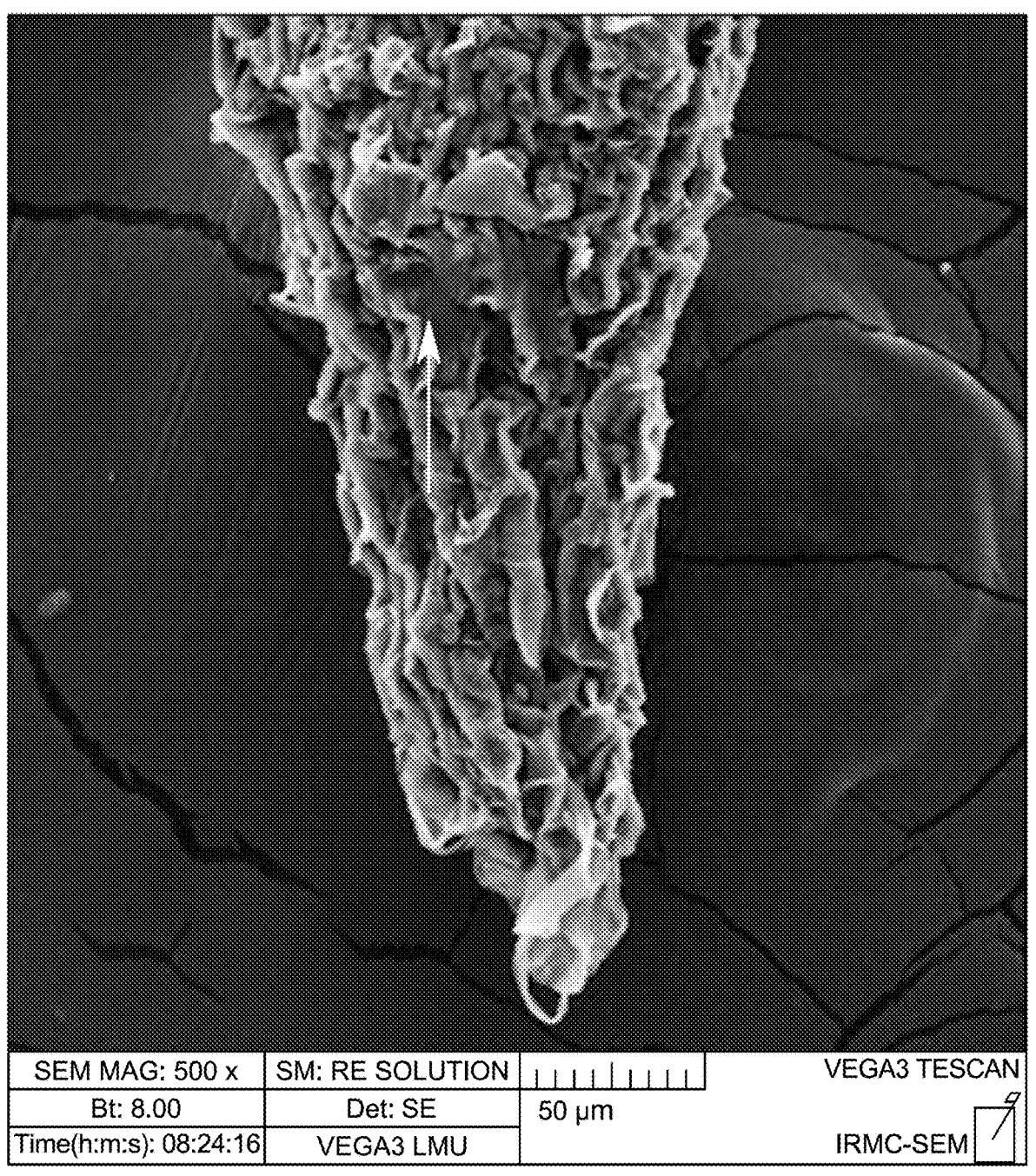

FIG. 6J shows a SEM image of $MgAl_2O_4$ NPs treated root with 100 mg/L concentration at a resolution of 50 μm, according to certain embodiments.

Figure 6K:
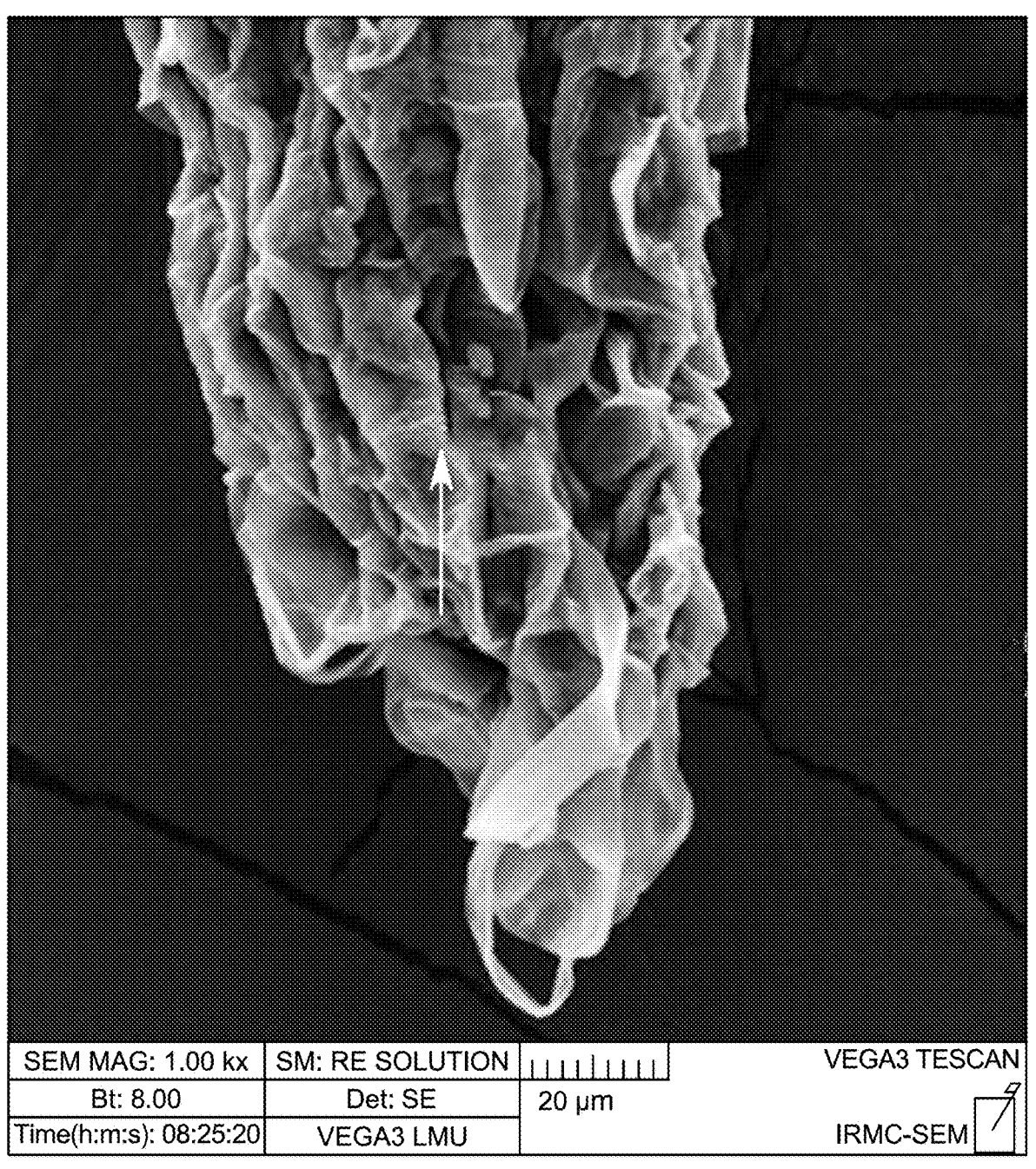

FIG. 6K shows a SEM image of $MgAl_2O_4$ NPs treated root with 100 mg/L concentration at a resolution of 20 μm, according to certain embodiments.

Figure 6L:
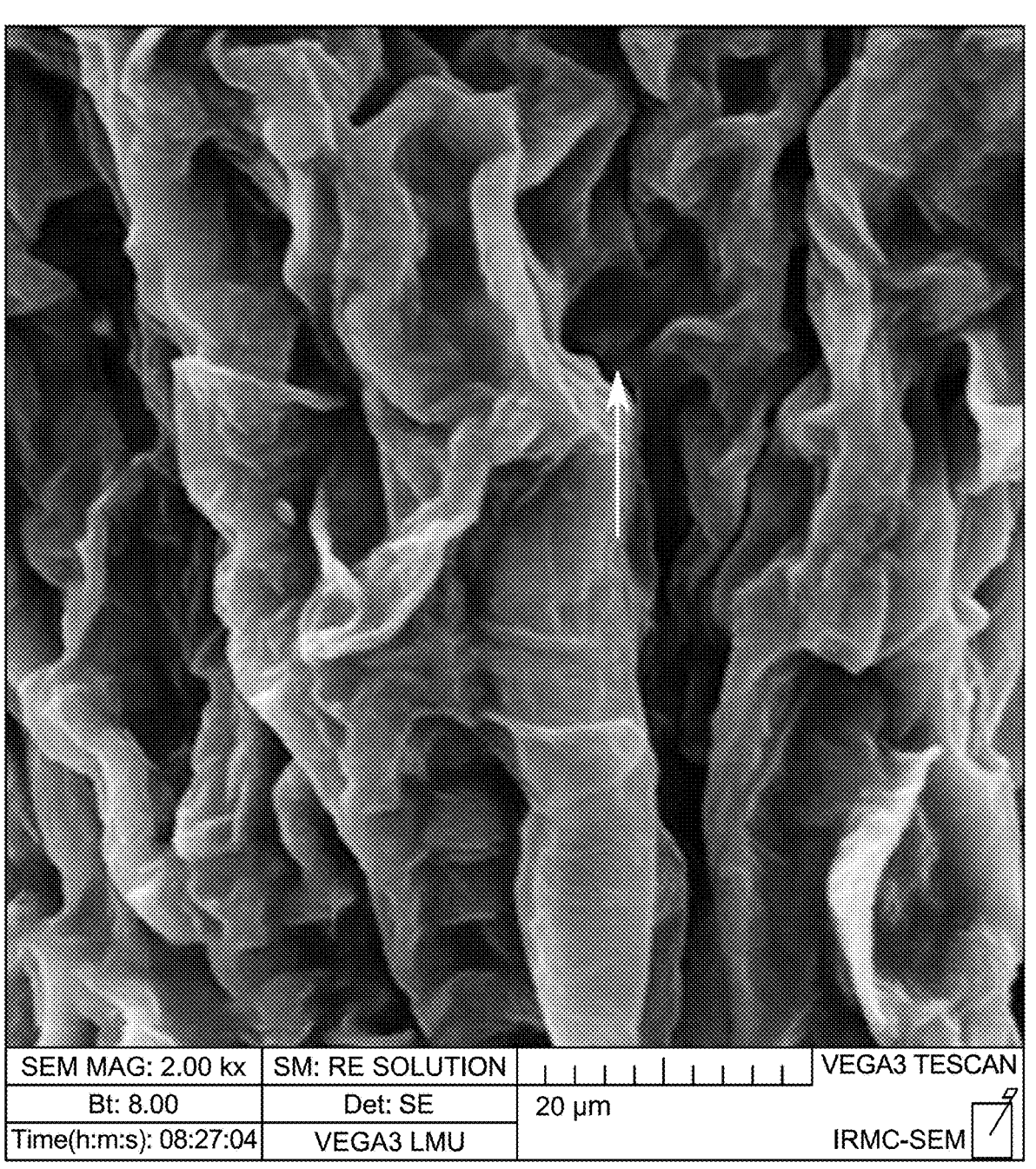

FIG. 6L shows a further SEM image of $MgAl_2O_4$ NPs treated root with 100 mg/L concentration at a resolution of 20 μm to highlight the damage caused by the NPs, according to certain embodiments.

Figure 6M:
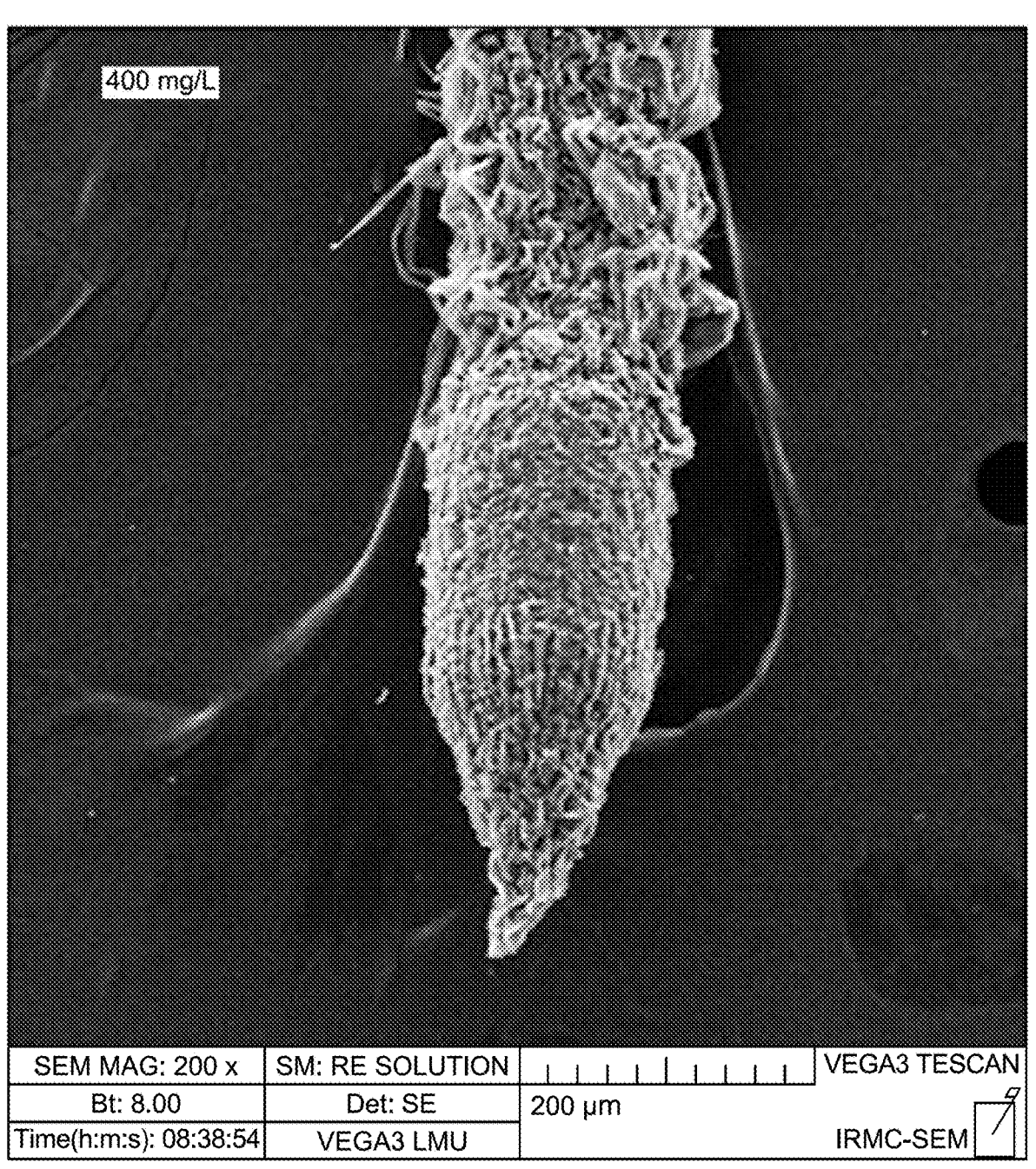

FIG. 6M shows a SEM image of $MgAl_2O_4$ NPs treated root with 400 mg/L concentration at a resolution of 200 μm, according to certain embodiments.

Figure 6N:
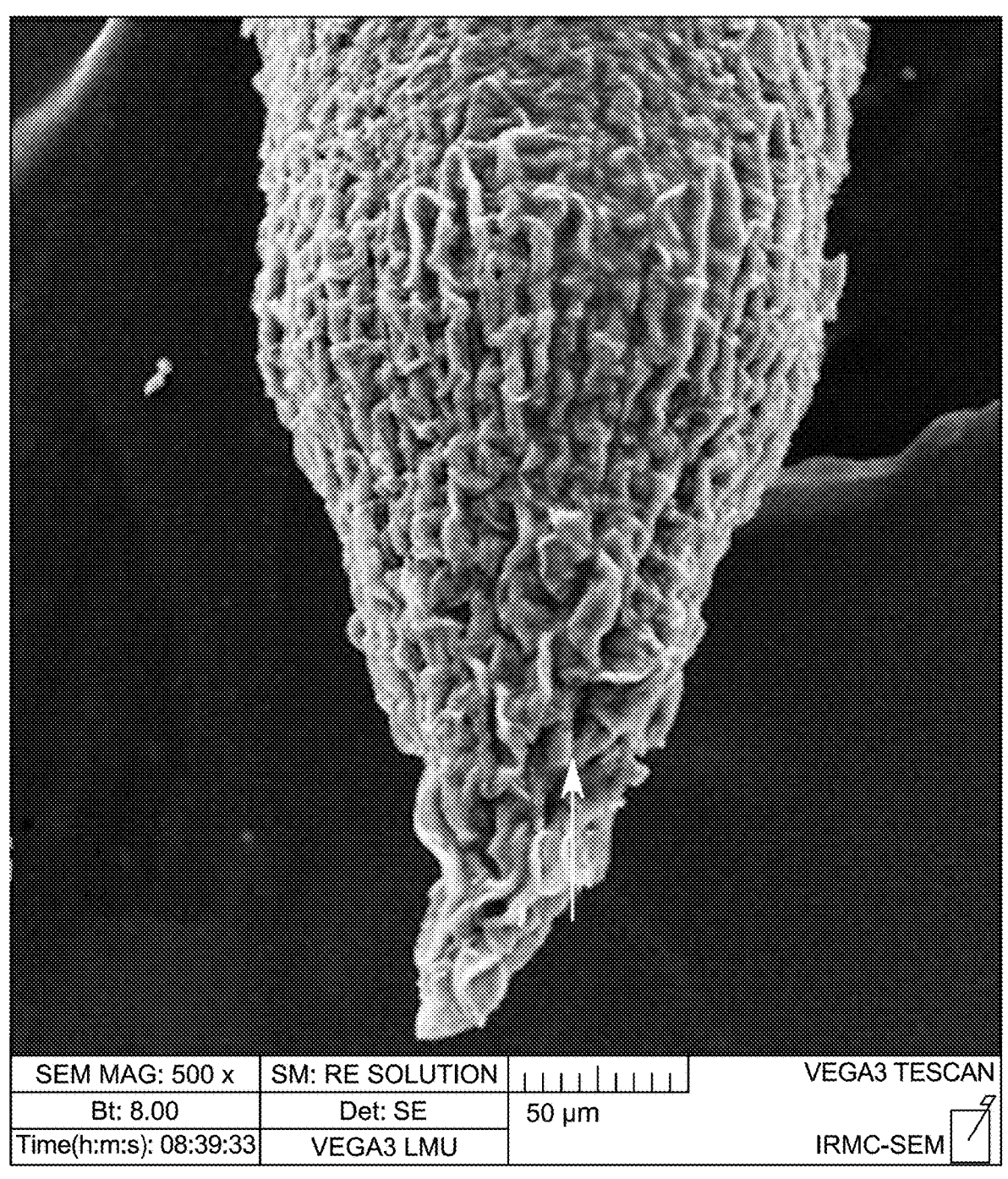

FIG. 6N shows a SEM image of $MgAl_2O_4$ NPs treated root with 400 mg/L concentration at a resolution of 50 μm, according to certain embodiments.

Figure 6O:
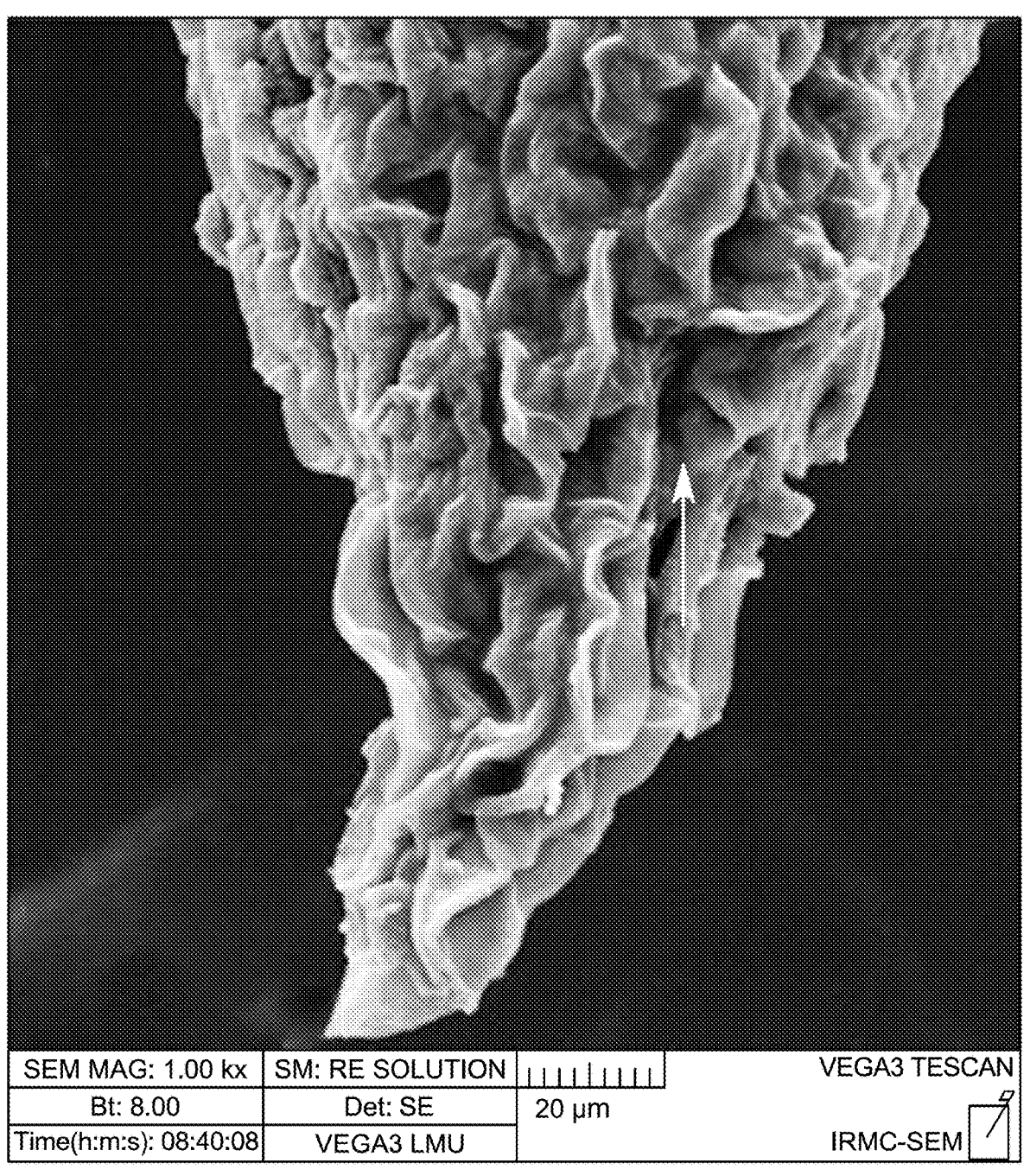

FIG. 6O shows a SEM image of $MgAl_2O_4$ NPs treated root with 400 mg/L concentration at a resolution of 20 μm, according to certain embodiments.

Figure 6P:
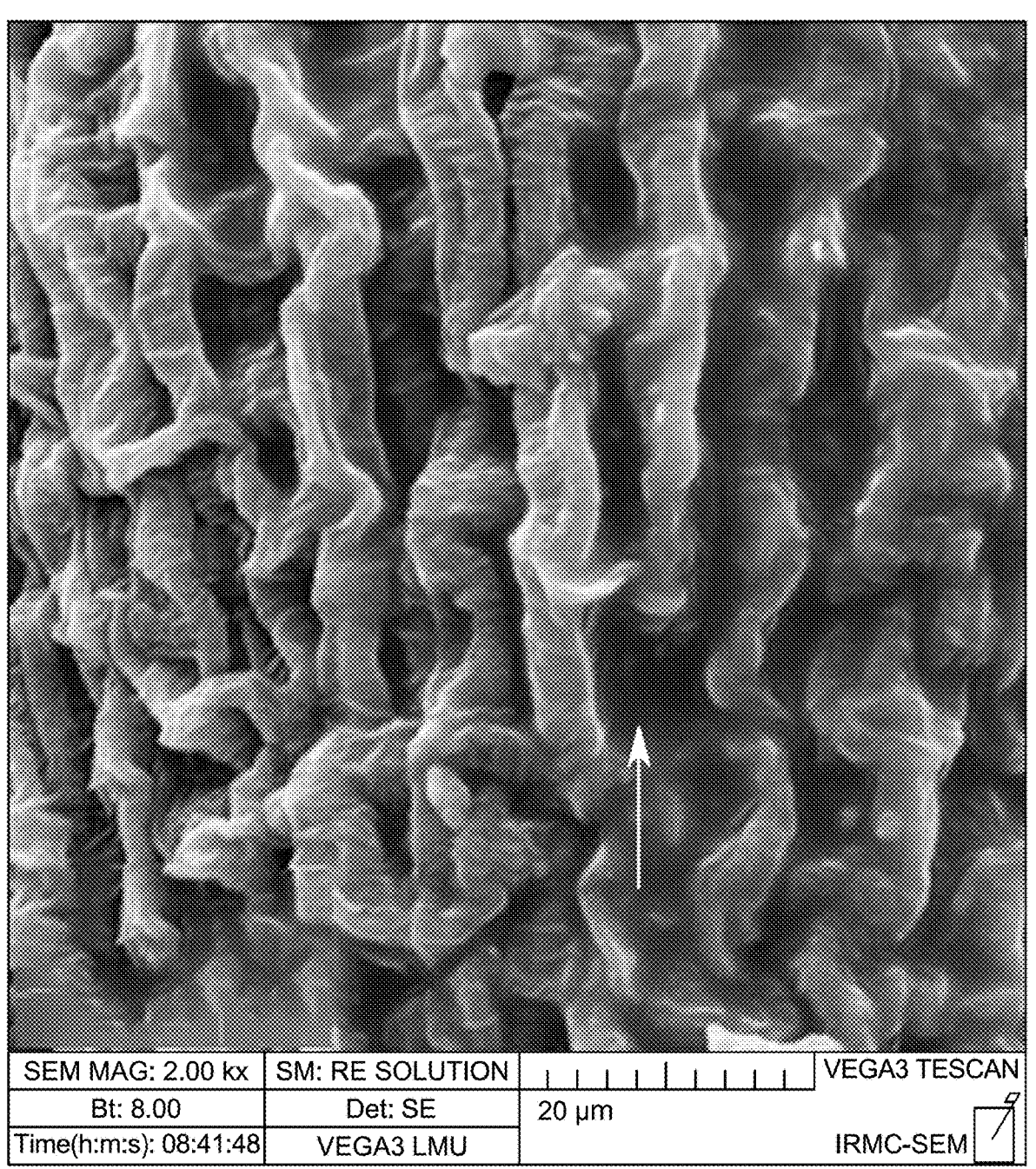

FIG. 6P shows a further SEM image of $MgAl_2O_4$ NPs treated root with 400 mg/L concentration at a resolution of 20 μm, according to certain embodiments.

Figure 7:
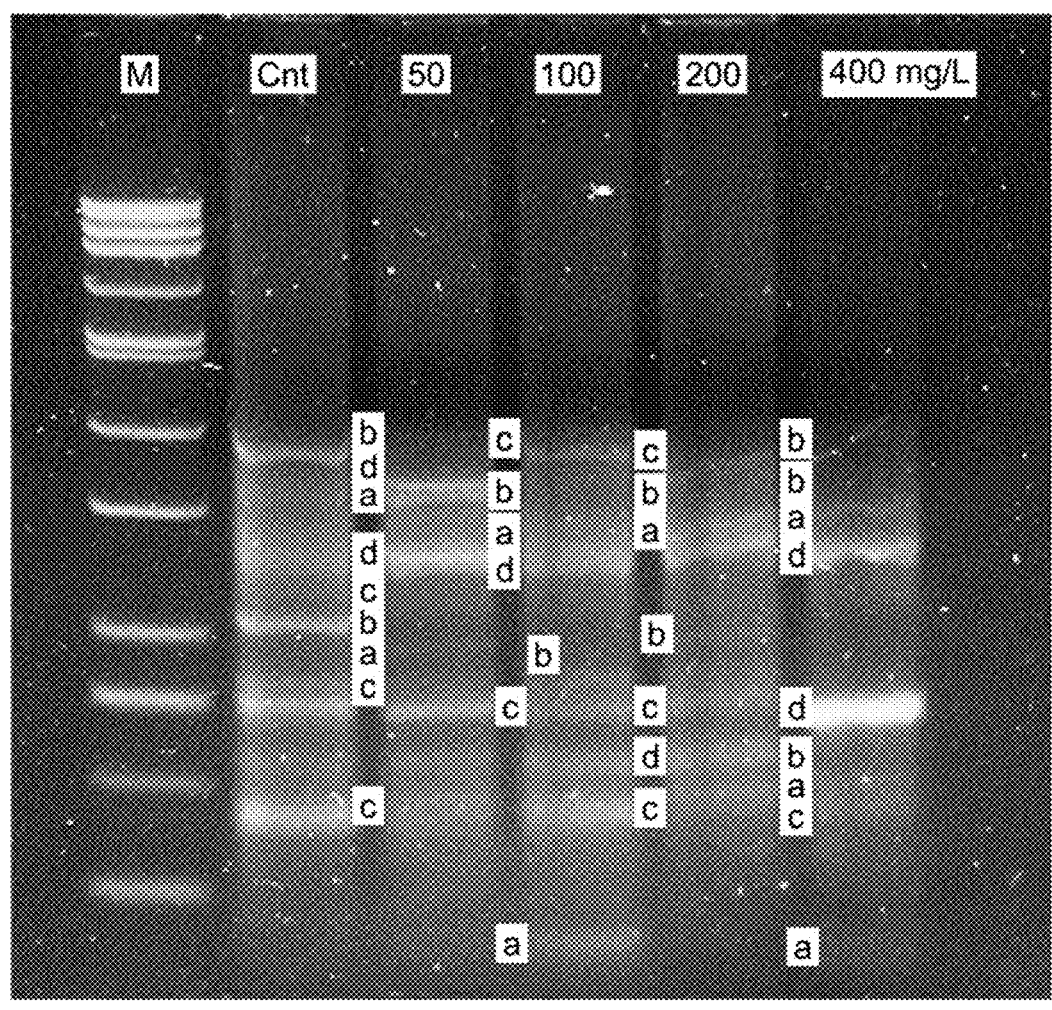

FIG. 7 is an image of randomly amplified polymorphic DNA-polymerase chain reaction (RAPD-PCR) profiles of both $MgAl_2O_4$ NPs-treated and untreated (control) barley roots, according to certain embodiments.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words 'a,' 'an' and the like generally carry a meaning of 'one or more,' unless stated otherwise.

The use of the terms 'comprise', 'comprises', 'comprising', 'include,' 'includes', 'including,' 'have,' 'has,' or 'having' should be generally understood as open-ended and non-limiting unless specifically stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'compound' refers to a chemical entity, regardless of its phase—solid, liquid, or gaseous—as well as its state-crude mixture, purified, or isolated.

As used herein, the term 'particle' refers to a small object that acts as a whole unit with regard to its transport and properties.

As used herein, the term 'nanoparticles (NPs)' refers to particles having a particle size of 1 nanometer (nm) to 500 nm within the scope of the present invention. There is no particular intention to limit the shape of the nanoparticles which may be employed in the present disclosure: particles that are fibrous, acicular, spherical, ellipsoidal, cylindrical, bead-like, cubic or platelet-like may be used alone or in combination. Moreover, it is envisaged that agglomerates of more than one particle type may be used.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy.

As used herein, the term 'seed' is a mature reproductive structure of a plant that contains an embryo, stored nutrients, and a protective outer coat. It serves as a means for plant reproduction and dispersal, allowing the plant to grow and develop under suitable environmental conditions. The seed includes the embryo (which will develop into a new plant), cotyledons (seed leaves), and a protective seed coat that shields the embryo from damage and environmental stress.

The term "germination" is understood to mean the process that starts with water uptake by the seed (inhibition) and that ends with the start of elongation by the embryonic axis, usually the radicle. It comprises numerous events, including but not limited to protein hydration, subcellular structural changes, respiration, macromolecular syntheses, and cell elongation, none of which is itself unique to germination Herein seeds are deemed to be germinated when 65% of the control roots reached a length of about 0.5 cm or more.

As used herein, the term 'hydroponic dispersion' refers to the method of growing plants in a nutrient-rich water solution, where the plant roots are submerged or exposed to the solution, instead of being planted in soil. This method allows for the direct delivery of nutrients and water to the plant roots, facilitating efficient growth and development. In hydroponic dispersion systems, plants rely on a carefully balanced mixture of water, minerals, and oxygen to support their nutritional needs, often in a controlled environment that enhances growth conditions.

As used herein, the term 'Hoagland solution' refers to a nutrient solution commonly used in hydroponic systems to provide essential minerals and nutrients to plants. It contains a mixture of macro and micronutrients, including nitrogen, phosphorus, potassium, calcium, magnesium, sulfur, iron, and trace elements, which are required for plant growth.

As used herein, the term 'sol-gel method' is a chemical process used to synthesize materials, typically in the form of powders, coatings, or films, by transitioning from a liquid (sol) to a solid (gel) state. The gel is then dried and heated (calcined) to produce a final solid material, often in the form of NPs, ceramics, or thin films.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, the term 'calcination' refers to a thermal treatment process which is conducted in the absence of, or under a restricted supply of ambient air or oxygen. Calcination may be performed to remove impurities or volatile substances and/or to induce thermal decomposition or a change in the thermally treated material.

As used herein, the term 'priming' is a pre-germination treatment process in which seeds are hydrated under controlled conditions to trigger early metabolic activity, without initiating full germination. This process helps to enhance seed vigor, speed up germination, and improve seedling establishment by preparing the seed for optimal growth once environmental conditions are favorable. Priming typically involves soaking seeds in water or a solution (such as a nutrient, osmotic agent, or plant growth regulator) for a specific duration, followed by drying or immediate planting.

The term 'scarification' as used herein references the weakening, opening, or otherwise altering of the coat of a seed (testa) to encourage germination: scarification should typically render the seed coat more permeable to fluids, such as water and air. Scarification may be performed mechanically, thermally, chemically or by a combination thereof.

The term 'stratification' as used herein with respect to seeds, references a process of artificially or naturally interrupting a seed's embryonic dormancy so that the seed can germinate. Suitable stratification processes may be abiotic, of which thermal stratification is an example whereby seeds are typically subjected to cold conditions which soften the testa thereof. In the alternative, stratification may be biotic wherein the seed is treated with biological components, such as endophytes.

As used herein, the term 'sonication' refers to the application of sound (acoustic) waves to a medium and, specifically herein the application of sound waves to agitate particles in an aqueous dispersion thereof. Hereinafter, the term "sound" will be used to refer to both audible sound and ultrasound. Given that acoustic waves are mechanical vibrations, a medium is required for waves to travel or propagate in. Vibrations on a surface of the sound source (transducer) transfer acoustic energy to the medium. Conventionally at least a part of a sound source—such as a microtip sonicator probe—should be surrounded by the medium: this is on the basis that a solid contact between the transducer and a vessel in which a medium may be disposed, in the absence of an acoustic compliant material, is generally considered not to effectively transfer the sound waves into the medium.

Without being bound by theory, it is considered that acoustic energy is carried through the aqueous medium by oscillations of the liquid molecules in the direction of propagation. This produces alternating adiabatic compressions and decompressions together with corresponding increases and decreases in density and temperature. If the periodic decreases of pressure in the liquid are sufficiently high during the negative pressure phase, the cohesive forces of the liquid may be exceeded, at which point small cavities are formed by the process of cavitation. These small cavities then rapidly collapse, producing an amplitude shock wave with local temperatures up to a few hundred degrees centigrade or more. The collapse of the cavities may further create electrical discharges upon their collapse, giving rise to the effect known as sonoluminescence.

To characterize a medium acoustically, the most important parameter is the acoustic impedance, Z. For a lossless medium, Z-pc, where p is the density of the medium and c is the speed of sound in the medium. When the incident sound is perpendicular to the reflecting interface, i.e. when the angle of incidence is 0, the fraction of passed power $P_2$ and incident power $P_1$ is given by the formula: $P_2/P_1 = (4Z_1Z_2)/(Z_1+Z_2)^2$. In a non-elastic, aqueous media, such as that of the present disclosure, there is continuous transition as long as the amplitude of the sound is relatively low. As amplitude is increased, however, the magnitude of the negative pressure in the areas of rarefaction may eventually become sufficient to cause cavitation. Generally, at an acoustic wave frequency below 100 kHz, the intensity required to produce vaporous cavitation is almost independent of frequency. Above that, the intensity needed for vaporous cavitation rises as a function of acoustic wave frequency. In the present disclosure, the amplitude and frequency of the applied acoustic waves should not induce cavitation in the hydroponic dispersion.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to a method for utilizing nanoparticles (NPs) as nutritional additives in agriculture. The method includes the application of a nanofertilizer, including magnesium aluminate ($MgAl_2O_4$), to plants, specifically barley, in a hydroponic system. The NPs are applied at concentrations ranging from 50 to 400 mg/L, with the uptake, transport, nutritional effects, and potential genotoxicity in plants being monitored. At lower NP concentrations (50 mg/L), significant growth enhancements, including improved germination, leaf/root lengths, biomass, and photosynthetic parameters, were observed.

Figure 1:
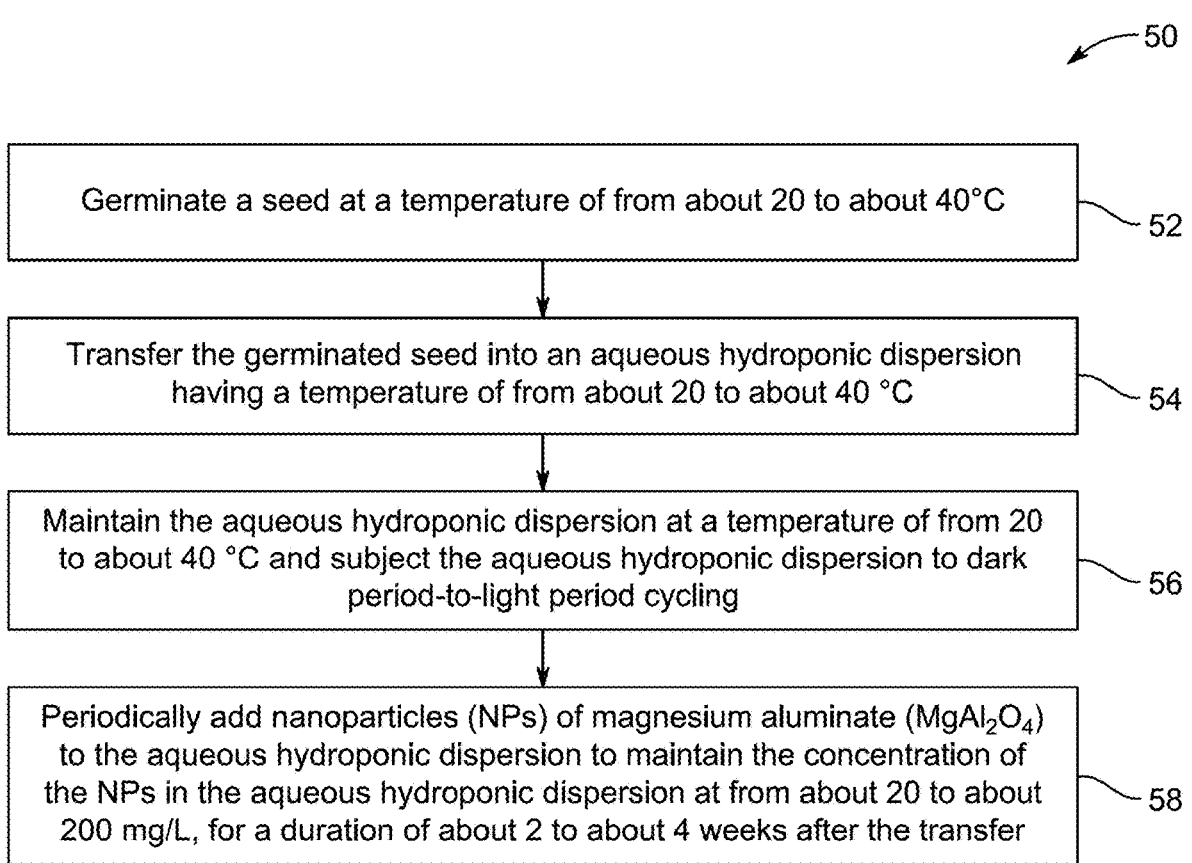
FIG. 1 is a method flowchart for increasing at least one of the chlorophyll-a concentration and the chlorophyll-b concentration in the leaves of a plant of the genus *Hordeum*, according to certain embodiments.

FIG. 1 illustrates a flow chart of a method 50 of increasing at least one of the chlorophyll-a concentration and the chlorophyll-b concentration in the leaves of a plant of the genus *Hordeum* which has been hydroponically grown from seed over a duration of from about 2 to about 4 weeks. Examples of plants of genus *Hordeum* include but are not limited to: *Hordeum vulgare; Hordeum bulbosum; Hordeum marinum; Hordeum jubatum; Hordeum distichon; Hordeum brevisubulatum; Hordeum glaucum; Hordeum murinum; Hordeum arizonicum; Hordeum depressum; Hordeum secalimim; Hordeum spontaneum; Hordeum longipedicellatum; Hordeum praealpimim; Hordeum pecinatum; Hordeum depressiflorum; Hordeum villosum; Hordeum dimor-*

*phum; Hordeum secalinoides; Hordeum hygrophilum; Hordeum erectum; Hordeum ramosum; Hordeum caespitosum; Hordeum confusum; Hordeum latifolium; Hordeum subsecundum; Hordeum sagittatum; Hordeum micropodum; Hordeum glabrum*; and, *Hordeum elegans*. In some embodiments, the plant is selected from the group consisting of: *Hordeum vulgare; Hordeum spontaneum; Hordeum jubatum; Hordeum pussilum; Hordeum bulbosum; Hordeum murimim; Hordeum deficiens; Hordeum distichon; Hordeum hexastichon; Hordeum zeocriton; Hordeum trifurcatum; Hordeum intermedium*; and, combinations thereof. In a preferred embodiment, the plant is *Hordeum vulgare*.

The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

In some embodiments, the method 50 further includes priming the seed prior to the germinating thereof. The priming includes the controlled hydration of the seed to induce pre-germination metabolic processes in the seed. In some embodiments, the priming involves treating the seed with a nutrient solution to stimulate pre-germination activity. In some embodiments, priming the seed includes placing it in a temperature-controlled environment with regulated moisture to promote early metabolic activity. In some embodiments, the method 50 includes priming the seed by exposing it to a hydration process, where water uptake is carefully controlled to induce metabolic processes without fully initiating germination. In other embodiments, the seed is subjected to osmotic priming using a sugar or salt solution to encourage early physiological changes before germination.

At step 52, the method 50 includes germinating the seed at a temperature of from about 20 to about 40° C., for example at a temperature of from about 21° C. to about 39° C., from about 22° C. to about 38° C., from about 23° C. to about 37° C., from about 24° C. to about 36° C., from about 25° C. to about 35° C., from about 26° C. to about 34° C., from about 27° C. to about 33° C., from about 28° C. to about 32° C., or from about 29° C. to about 31° C.

Germinating includes at least one process selected from the group consisting of: soil planting the seed; disposing the seed on a water-impregnated material; water soaking of the seed; stratification of the seed; and, scarification of the seed.

In some embodiments, soil planting is done by directly placing the seed into the soil at a specific depth and covering it with soil to retain moisture. In other embodiments, the soil is prepared by tilling or loosening to create a fine bed, followed by placing the seed in rows or individual holes. Some embodiments involve incorporating fertilizers into the soil before planting to enhance nutrient availability. In certain embodiments, soil planting is performed in raised beds or containers with enriched potting soil, and mulch is applied to retain moisture and regulate temperature. Other embodiments use automated planting equipment to accurately place seeds at the correct depth and spacing.

Where germinating includes disposing the seed on a water-absorbent material, that material should permit both the penetration of the root of the sprouting seed and impregnation with water. Exemplary water-absorbent materials include cloth, fabric, cardboard, paper, foam, hydrogel or sponge, which can provide adequate moisture absorption and retention for germination. In exemplary embodiments, the seed is placed on a layer of water-soaked paper towel or fabric, ensuring the seed remains in constant contact with moisture. Some embodiments use a hydrogel or foam-based material that retains water and provides a stable environment for the seed to sprout. In other embodiments, the seed is placed on a water-impregnated material in a tray or shallow container, where the material allows for root penetration and desired water absorption during the germination process.

In some embodiments, the seed is soaked in water for a set period, typically ranging from a few hours to overnight, to facilitate water absorption and softening of the seed coat. In other embodiments, the seed is soaked in warm water to accelerate germination by enhancing enzyme activity. Some embodiments involve using a pre-soaking method, wherein the seeds are immersed in water mixed with growth stimulants or nutrients to promote faster germination. In alternative embodiments, the seed is soaked in a continuous water flow or within a water reservoir to maintain consistent moisture levels. It is not precluded any applied soaking process be followed by the draining of the excess water before planting the seed in the soil or on a germination medium.

In some embodiments, seed stratification is achieved by exposing the seed to cold temperatures, typically by placing it in a refrigerator for a specified period to break dormancy. In other embodiments, seeds are mixed with moist sand, peat, or other substrates and stored in cold, moist conditions for a set duration to simulate natural winter conditions. Some embodiments involve alternating between cold and warm temperatures to further enhance germination rates. In alternative embodiments, seeds are stratified by placing them in a controlled environment with regulated humidity and temperature to mimic seasonal changes. Additionally, in some embodiments, seeds are stratified by soaking them in water at cold temperatures for a specified time before planting.

In some embodiments, scarification is performed by mechanically scratching the seed coat using sandpaper or a file to create a small opening, allowing water to penetrate and initiate germination. In other embodiments, seeds are treated with sulfuric acid or other chemical solutions to weaken or break down the seed coat, facilitating water absorption. Some embodiments involve soaking seeds in hot water for a short time, followed by rapid cooling, to crack the seed coat and promote germination. In alternative embodiments, scarification is achieved by using a small-scale mechanical device that cracks the seed coat through pressure or abrasion. Additionally, in some embodiments, seeds are subjected to fire or heat treatments to break the dormancy imposed by the hard seed coat.

At step 54, the method 50 includes transferring the germinated seed into an aqueous hydroponic dispersion having a temperature of from about 20 to about 40° C., for example a temperature of from about 21° C. to about 39° C., from about 22° C. to about 38° C., from about 23° C. to about 37° C., from about 24° C. to about 36° C., from about 25° C. to about 35° C., from about 26° C. to about 34° C., from about 27° C. to about 33° C., from about 28° C. to about 32° C., or from about 29° C. to about 31° C. The aqueous hydroponic dispersion includes NPs of $MgAl_2O_4$ at a concentration of from about 20 to about 200 mg/L. For example, the hydroponic dispersion may comprise NPs of $MgAl_2O_4$ at a concentration of from about 30 to about 190 mg/L, from about 40 to about 180 mg/L, from about 50 to about 170 mg/L, from about 60 to about 160 mg/L, from about 70 to about 150 mg/L, from about 80 to about 140 mg/L, from about 90 to about 130 mg/L, and from about 100 to about 120 mg/L.

In some embodiments, NPs of $MgAl_2O_4$ are synthesized using a sol-gel method. In some embodiments, the method of making NPs of $MgAl_2O_4$ comprises: dissolving citric acid, aluminum nitrate, and magnesium nitrate hexahydrate in deionized water at from about 50 to about 100° C., preferably from about 60 to 90° C., and more preferably at 80° C. for a duration of from about 20 to about 60 minutes (min), preferably from about 25 to about 35 min, and more preferably 30 min under continuous agitation; adjusting the pH of the mixture to from about 5 to about 9, preferably from about 6 to about 8, and more preferably 7 using aqueous ammonia; heating the mixture at a temperature of from about 120 to about 160° C., preferably from about 130 to about 155° C., and more preferably about 150° C. for a duration of from about 20 to about 60 min., preferably from about 25 to about 35 min, and more preferably about 30 min to form a viscous gel; and, incinerating the viscous gel to produce a powder. The method further includes raising the temperature to from about 300 to about 400° C., preferably from about 320 to about 360° C., and more preferably about 350° C. to completely convert the gel to powder and to calcine said powder.

It is not precluded in the present method, that the powder directly obtained after calcination step may be subjected to at least one of comminution, homogenization or classification in order to moderate the particle size distribution thereof.

$MgAl_2O_4$ has: an oxygen content in a range of from about 30 to about 50 wt. %, preferably from about 35 to about 45 wt. %, and more preferably 41.48 wt. %; a magnesium content in the range of from about 10 to about 25 wt. %, preferably from about 15 to about 22 wt. %, and more preferably 19.89 wt. %; an aluminum content in the range of from about 30 to about 50 wt. %, preferably from about 35 to about 45 wt. %, and more preferably 38.27 wt. %.

The $MgAl_2O_4$ has a cubic spinel structure, as determined by X-ray diffraction (XRD). Spinel oxides having $AB_2O_4$ (A=Mn, Cu, Ni, Zn, Fe, Ni; B═Cr, Ni, Mn, Mo, Ni) formula have normal, inverse, or complex structures determined by cation occupation of octahedral (Oh) or tetrahedral (Td) sites. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal". Conversely, when tetrahedral sites are occupied by half of the $B^{3+}$ and octahedral sites by the other half along with $A^{2+}$, the spinel phase is termed "inverse". The spinel phase with the chemical formula $MgAl_2O_4$ is a mineral type of this oxide family and possesses high thermal stability (melting point at 2135° C.), high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 g/cm³)), high thermal shock resistance, hydrophobicity, and low surface acidity.

In some embodiments, the NPs of $MgAl_2O_4$ have a median volume particle size (Dv50) of from about 10 to about 40 nm, for example from about 11 nm to about 39 nm, from about 12 nm to about 38 nm, from about 13 nm to about 37 nm, from about 14 nm to about 36 nm, from about 15 nm to about 35 nm, from about 16 nm to about 34 nm, from about 17 nm to about 33 nm, from about 18 nm to about 32 nm, from about 19 nm to about 31 nm, or from about 20 nm to about 30 nm, as determined by transmission electron microscopy (TEM). In some embodiments, the NPs of $MgAl_2O_4$ have a median volume particle size (Dv50) of from about 10 to about 30 nm, for example from about 11 nm to about 29 nm, from about 12 nm to about 28 nm, from about 13 nm to about 27 nm, from about 14 nm to about 26 nm, from about 15 nm to about 25 nm, from about 16 nm to about 24 nm, from about 17 nm to about 23 nm, from about 18 nm to about 22 nm, from about 19 nm to about 21 nm, or about 20 nm, as determined by TEM.

In some embodiments, the NPs of $MgAl_2O_4$ have a Dv90 particle diameter of less than about 50 nm, for example less than about 45 nm, less than about 40 nm, less than about 35 nm, or less than about 30 nm, as determined by TEM.

The NPs of $MgAl_2O_4$ may have, in certain embodiments, a sphericity of at least about 0.4. The NPs of $MgAl_2O_4$ with a sphericity of at least 0.4 improve dispersion and stability in hydroponic systems, ensuring uniform nutrient distribution, preventing aggregation, and enhancing plant nutrient uptake for better growth and efficiency.

In some embodiments, the aqueous hydroponic dispersion into which the germinated seeds are transferred includes NPs of $MgAl_2O_4$ at a concentration of from about 30 to about 150 mg/L, for example from about 40 mg/L to about 140 mg/L, from about 50 mg/L to about 130 mg/L, from about 60 mg/L to about 120 mg/L, from about 70 mg/L to about 110 mg/L, from about 80 mg/L to about 100 mg/L, or about 90 mg/L. In some embodiments, the aqueous hydroponic dispersion into which the germinated seeds are transferred includes NPs of $MgAl_2O_4$ at a concentration of from about 30 to about 120 mg/L, for example from about 40 mg/L to about 110 mg/L, from about 50 mg/L to about 100 mg/L, from about 60 mg/L to about 90 mg/L, or from about 70 mg/L to about 80 mg/L. In some embodiments, the aqueous hydroponic dispersion into which the germinated seeds are transferred includes NPs of $MgAl_2O_4$ at a concentration of from about 30 to about 90 mg/L, for example from about 40 mg/L to about 80 mg/L, or preferably from about 50 mg/L to about 70 mg/L.

Upon transferring the germinated seed, the aqueous hydroponic dispersion is subjected to sonication to obviate aggregation of the NPs of $MgAl_2O_4$. The application of sonication does not preclude the application of other modes of agitation to obviate aggregation of the NPs of $MgAl_2O_4$. Exemplary modes of agitation include but are not limited to: stirring; swirling; mixing; or, a combination thereof.

Sonication should desirably comprise the application of sound waves at ultrasonic frequencies of from about 15 to about 10 MHZ, for example from about 15 to about 175 kHz or from about 15 kHz to about 100 kHz. Independently of, or additional to this preferred frequency, the sonication intensity applied to the hydroponic dispersion may be from about 0.125 to about 10 watts/cm$^2$. For instance, a preferred acoustic transducer assembly or array may provide a plurality of transducer elements providing a total of from about 0.5 to about 2 watts/cm$^2$.

The sonication of the hydroponic dispersion may be applied for an effective duration of time to obviate aggregation of the NPs of $MgAl_2O_4$, such as for at least 1 minute, from about 1 to about 15 minutes or from about 1 to about 10 minutes. The applied acoustic waves may desirably be selected from the group consisting of: sinusoidal waveforms, square waveforms, triangular waveforms; sawtooth waveforms; and combinations thereof.

Within the aforementioned effective duration, the sonication may be applied continuously but is preferably pulsed Such pulsing can be for times of from about 20 milliseconds to about 80 milliseconds or from about 20 to about 60 milliseconds per pulse. The waveform of each pulse may be independently selected. As such, each pulse may have the same waveform or alternatively a pulse may have a different waveform to that pulse which proceeded it.

At step 56, the method 50 includes, for a duration of about 2 to about 4 weeks, maintaining the aqueous hydroponic dispersion at a temperature of from 20 to about 40° C., and subjecting the aqueous hydroponic dispersion to dark period-to-light period cycling. The aqueous hydroponic dispersion may, for example, be maintained at a temperature of from about 21° C. to about 39° C., from about 22° C. to about 38° C., from about 23° C. to about 37° C., from about 24° C. to about 36° C., from about 25° C. to about 35° C., from about 26° C. to about 34° C., from about 27° C. to about 33° C., from about 28° C. to about 32° C., or from about 29° C. to about 31° C. In some embodiments, for the duration of about 2 to about 4 weeks after the transferring, the hydroponic dispersion is maintained at a temperature of from about 20 to about 30° C., from about 21° C. to about 29° C., from about 22° C. to about 28° C., from about 23° C. to about 27° C., or from about 24° C. to about 26° C. In the aforementioned dark period-to-light period cycling, each dark period is of x hours (h), each light period is of (24-x) h and x is from about 6 to about 12, preferably from about 7 to about 11, or more preferably from about 8 to about 10. In some embodiments, in the dark period-to-light period cycling, x is from about 6 to about 10, for example from about 7 to about 9, or about 8.

For the duration of about 2 to about 4 weeks after the transferring, the hydroponic dispersion is typically maintained in an environment having a controlled relative humidity of from about 50 to about 80%, preferably 55 to 75%, and yet more preferably 70%.

At step 58, the method 50 includes periodically adding NPs of $MgAl_2O_4$ to the aqueous hydroponic dispersion to maintain—for the duration of about 2 to about 4 weeks after the seed transferring—the concentration of the NPs in the aqueous hydroponic dispersion at from about 20 to about 200 mg/L, for example from about 30 mg/L to about 180 mg/L, from about 40 mg/L to about 160 mg/L, from about 50 mg/L to about 140 mg/L, from about 60 mg/L to about 120 mg/L, from about 70 mg/L to about 100 mg/L, or from about 80 mg/L to about 90 mg/L, Periodically adding the NPs helps to maintain an efficient concentration level, ensuring continued beneficial effects on plant growth, nutrient absorption, and other physiological processes throughout the duration of the hydroponic cultivation period. The periodically added $MgAl_2O_4$ has a cubic spinel structure, as determined by XRD. The aqueous dispersion is subjected to sonication, as described above, after each periodic addition of the NPs of $MgAl_2O_4$ in order to obviate the aggregation thereof. This helps maintain a uniform distribution of NPs, allowing for consistent and effective interaction with the plants, enhancing their uptake and promoting uniform growth.

EXAMPLES

The following examples demonstrate a method for increasing at least one of the concentrations of chlorophyll-a and/or chlorophyll-b in the leaves of a plant of the genus *Hordeum*. The examples are provided solely for illustration and are not to be construed as limitations of the present disclosure, as many variations are possible without departing from the spirit and scope of the present disclosure.

Example 1: Preparation of Magnesium Aluminate (MgAl₂O₄) Nanoparticles (NPs)

According to the present disclosure, $MgAl_2O_4$ NPs were synthesized using a modified sol-gel method. A homogeneous solution was prepared by dissolving citric acid ($C_6H_8O_7$), aluminum nitrate ($Al(NO_3)_3$), and magnesium nitrate hexahydrate ($Mg(NO_3)_2 \cdot 6H_2O$) in 50 milliliters (mL) of deionized (DI) water ($H_2O$) at a temperature of 80° C. The solution was then continuously agitated for 30 minutes (min) to ensure complete dissolution. The pH of the resulting solution was adjusted to 7 using an ammonia ($NH_3$) solution, and the mixture was heated at 150° C. for 30 minutes to generate viscous gels that were subsequently incinerated to produce a black powder. Further, the temperature of solution was then elevated to 350° C. in order to completely convert the emulsion gel into a fine powder. Furthermore, to complete the formation of $MgAl_2O_4$ NPs, the final components were subjected for calcination at 700° C. for 5 hours (h). The structure of the $MgAl_2O_4$ NPs was analyzed using an X-ray diffractometer (XRD) equipped with a copper (Cu) Kα radiation source ($\lambda$=1.5406 angstrom (Å)). Additionally, surface characterization was conducted using transmission electron microscopy (TEM) and field-emission scanning electron microscopy (FE-SEM) coupled with energy-dispersive X-ray spectroscopy (EDS) (Thermo Scientific Inc.) to examine the morphology and elemental composition of the synthesized $MgAl_2O_4$ NPs.

Example 2: Growing Conditions for Plants and Treatment with NPs

Twenty barley (*Hordeum vulgare* L.) seeds were germinated in moist tissue paper at 28° C. Germination was considered complete when 65% of the control roots reached a length of 0.5 centimeter (cm) or more (United States Environmental Protection Agency, 1996). Once germinated, ten seeds were randomly selected and placed in hydroponic systems including a modified Hoagland solution, with concentrations of 50 milligrams per liter (mg/L), 100 mg/L, 200 mg/L, or 400 mg/L of NPs, or in a control solution without NPs. Where applicable, to avoid or reduce NPs aggregation, the liquid mixtures were sonicated in a sonic water bath (Powersonic 410, Hwashin Technology, Korea) for 30 minutes. Furthermore, the seedlings were then grown for 3 weeks under greenhouse conditions with a 16:8 light/dark cycle, 70% humidity, and a temperature of from 23° C. to 25° C. The nutritional solution was replaced every 3 days at the same NPs concentration. At the end of the third week, measurements were taken for the plants' fresh and dry weights, growth parameters, chlorophyll content, photosynthetic activity, relative water content (RWC), and elemental composition. A randomly amplified polymorphic DNA-polymerase chain reaction (RAPD-PCR) analysis was also performed at this stage.

Example 3: Determination of Photosynthetic Parameters & Pigments

The photosynthetic activity of the leaves treated with different doses of NPs was assessed by measuring the chlorophyll fluorescence. The experiment was carried out with three individual leaves from seedlings (n=3) using a PAM fluorometer (Walz® GmbH, Effeltrich, Germany). The seedlings were dark-adapted for 30 minutes prior to measurement. The leaf was attached to a clip holder, and a 450 nm maximum emission actinic pulse light was used. The photosynthetic photon flux density (PPFD) of the blue measuring light was 1,500 micromole (μmol) photon m$^{-2}$ s$^{-1}$, at a distance of 1 millimeter (mm) from the tip of the light guide.

Photosynthetic parameters were computed using the WinControl-3.29 program (Walz® GmbH, Effeltrich, Germany), including: effective photochemical quantum yield of photosystem II (Y(II)); maximum fluorescence (Fm); minimum fluorescence (Fo); electron transport rate (ETR). (max and min fluorescence, respectively). Fluorescence signal detection was accomplished with the use of a PIN-photodiode. Fv, the variable fluorescence, and Fv/Fm, the maximal quantum efficiency of PSII, were both calculated using the formula disclosed by Kitajima et al. [See: Kitajima et al., Biochim Biophys Acta (1975), 376 (1): 105-15, the disclosure of which is incorporated herein by reference in its entirety].

Homogenization of 50 mg of fresh leaf tissues in 4 mL of 80% acetone was performed to determine the pigment content. The extract was incubated at 68° C. for 15 minutes. Absorbances at 663 nm, 646 nm, and 470 nm were determined using a plate reader (Biotek, Synergy Neo 2) after spinning the supernatant at 4,000 revolutions per minute (rpm) for 15 minutes. The levels of carotenoids, chlorophyll-a, and -b were measured in line with the methods proposed by [See: Lichtenthaler H. K. and Wellburn A. R., *Determinations of total carotenoids and chlorophylls a and b of leaf extracts in different solvents, Biochemical Society Transactions*, 11 (5): 591-592 (1983), the disclosure of which is incorporated herein by reference in its entirety].

Example 4: Leaf Relative Water Content Assay

Based on Sade's method, the RWC (relative water content) of the leaves was determined following the procedure outlined in [See: Nir Sade, E. G. et al., *Tomato and barley leaf relative water content (RWC)*, www.bio-protocol.org/e1451, Vol. 5, 8:9-12 (2015), the disclosure of which is incorporated herein by reference in its entirety].

Three sets of fully developed barley leaves were evaluated for their fresh weights (FW). The excised sections were then immersed in a solution of 5 millimolar (mM) calcium chloride ($CaCl_2$)) for 8 hours while enclosed in airtight plastic bags. After measuring the turgid weight (TW), the leaf samples were incubated at 60° C. for three days of incubation period to obtain the plant's DW (dry weight). The RWC was then calculated using Eq. 1.

$$RWC = (FW-DW)/(TW-DW) \times 100 \tag{1}$$

Example 5: Observing Root Morphology by SEM

Following three weeks of exposure, the surface features and structure of the roots were examined using SEM (Inspect S50; FEI). The roots were cut out at the root tip, rinsed in phosphate-buffered saline (PBS, pH=7.4), and then immersed in a 4% glutaraldehyde solution overnight. The specimens were dehydrated step-by-step with an ethanol concentration gradient ranging from 25% to 100%. After dehydration, the specimens were carefully dried using a Leica EM CPD300, sputter-coated with gold using a Quorum Q150R ES, and then analyzed using scanning electron microscopy at 20 kilovolts (kV).

Example 6: Confocal Microscopy Analysis of Roots

Propidium iodide (PI) was used to stain the plant root tip cells to detect potential membrane damage. Staining the nucleus is possible with cationic dyes like PI because they cannot cross intact cell membranes but can enter damaged cytoplasm. The 10-mm root tips were immersed in a diluted PI solution for 4 minutes, after which they were filed down with a sterile razor blade (1% P-4170, Sigma). The tissue was rinsed twice for 1 minute each in distilled water to remove any remaining dye. A coverslip was placed over the roots, which were then attached to the slides. The roots were examined using confocal laser scanning microscopy (LSM 900, Zeiss, Germany) with red-colored PI dye. The chosen settings include using a red "PI dye" for excitation, with a maximum emission wavelength (2) of 617 nm and an excitation wavelength (+) of 536 nm.

Example 7: Elemental Analysis

The samples were collected after three weeks of exposure to NPs, dehydrated in an oven set at 70° C. for 3 days, and then crushed in a mortar. The samples were subsequently digested according to the U.S. EPA Procedure 3051. Further, the dry powder was coated with a mixture of pure $HNO_3$ (nitric acid, 65%) and $H_2O_2$ (hydrogen peroxide, 30%) in a ratio of 1:4. The coating process was carried out using Teflon-1 microwave digesting containers (10 mL MARS Xpress Vessels, made of PFA material, available from Chemical Engineering Materials (CEM)). Inductively coupled plasma optical emission spectroscopy (ICP-OES) analysis was performed to examine both macro- and micro-elements. The PerkinElmer Avio® 500 ICP-OES instrument, was used for elemental analysis.

Example 8: DNA Extraction and Genotoxicity Determination

After three weeks, the roots of both control and NPs-treated plants were collected and immediately crushed using liquid nitrogen. The whole genomic DNA was extracted using a GeneJET plant genomic DNA purification micro kit (Thermo Scientific, USA). The DNA template's integrity and purity were confirmed through gel electrophoresis analysis and by measuring the absorbance ratio at 260/280 nm using a NanoDrop spectrophotometer available from Thermo. The RAPD-PCR test was conducted using a Nexus GSX1 thermocycler manufactured available from Eppendorf (USA). A reaction mixture with a total volume of 25 microliters (μL) was prepared as follows: 12.5 μL of Gene-All® 2x master mix; 5 μL of OPA-8 primer mix; 1 μL of magnesium chloride ($MgCl_2$); 5 μL of deoxyribonucleic acid (DNA) template; and, quantum satis distilled water ($dH_2O$). The initial cycling conditions were programmed to start at a temperature of 94° C. for 3 minutes. The process was further followed by a series of 45 cycles, each including of 1 minute at 94° C., 1 minute at 36° C., and 2 minutes at 72° C. The final step involved extending the temperature to 72° C. for 5 minutes. An electrophoresis device was used to run the polymerase chain reaction (PCR) results for 45 minutes after loading them onto a 2% agarose gel. A UV transilluminator (Gel Doc XR+Imaging System, Biorad) was used to visualize the data with Image Lab Software.

Example 9: Statistical Analyses

All experiments were conducted using randomized sets, and at least three samples were taken. The variance of the experimental data was examined using the t-test. The experimental value was compared to the control or treatment values, an asterisk was used to indicate statistically significant changes ($p<0.05$, $p<0.01$, and $p<0.005$).

Figure 2A:
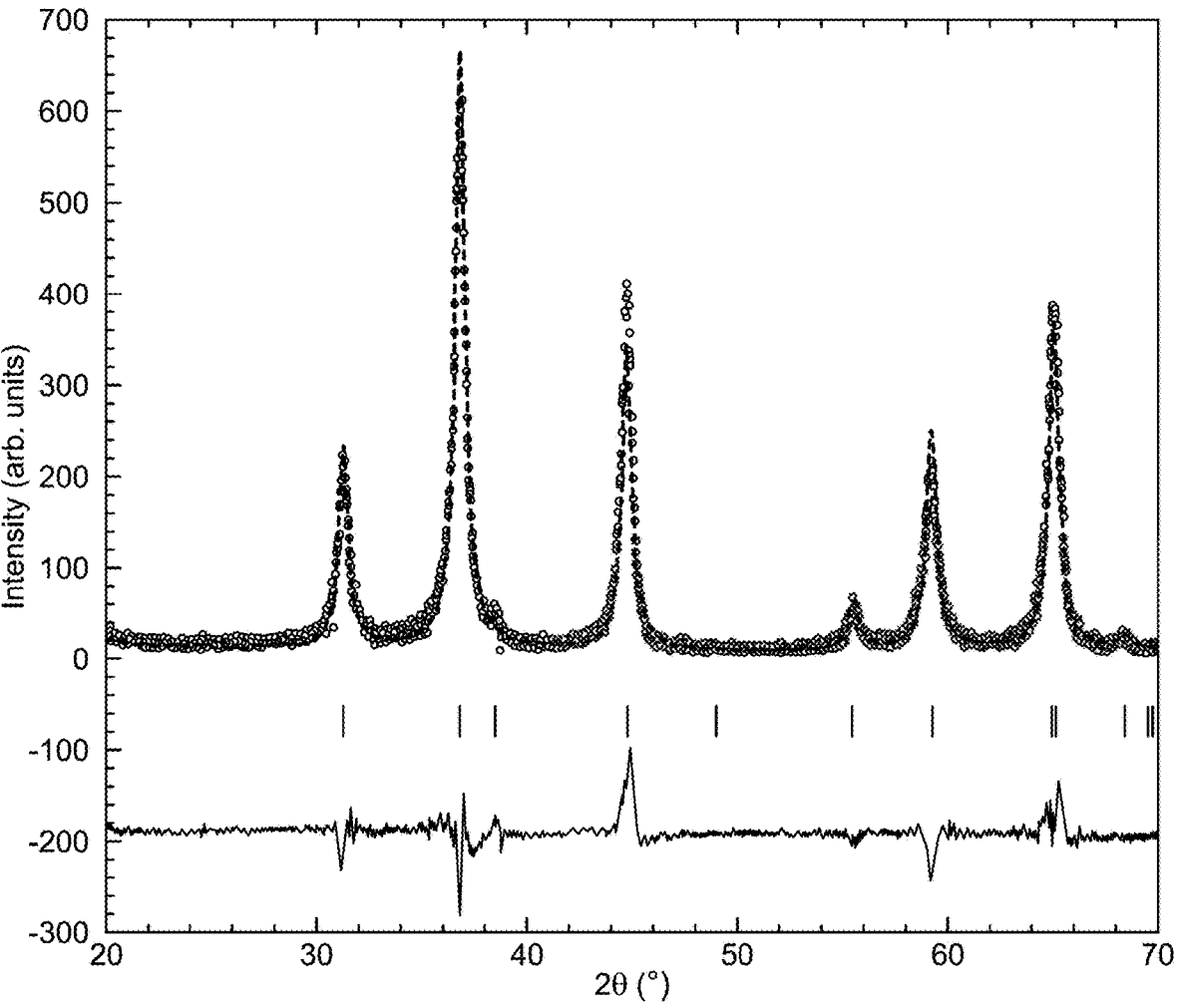
FIG. 2A shows X-ray diffraction (XRD) pattern of magnesium aluminate ($MgAl_2O_4$) nanoparticles (NPs), according to certain embodiments.
Figure 2B:
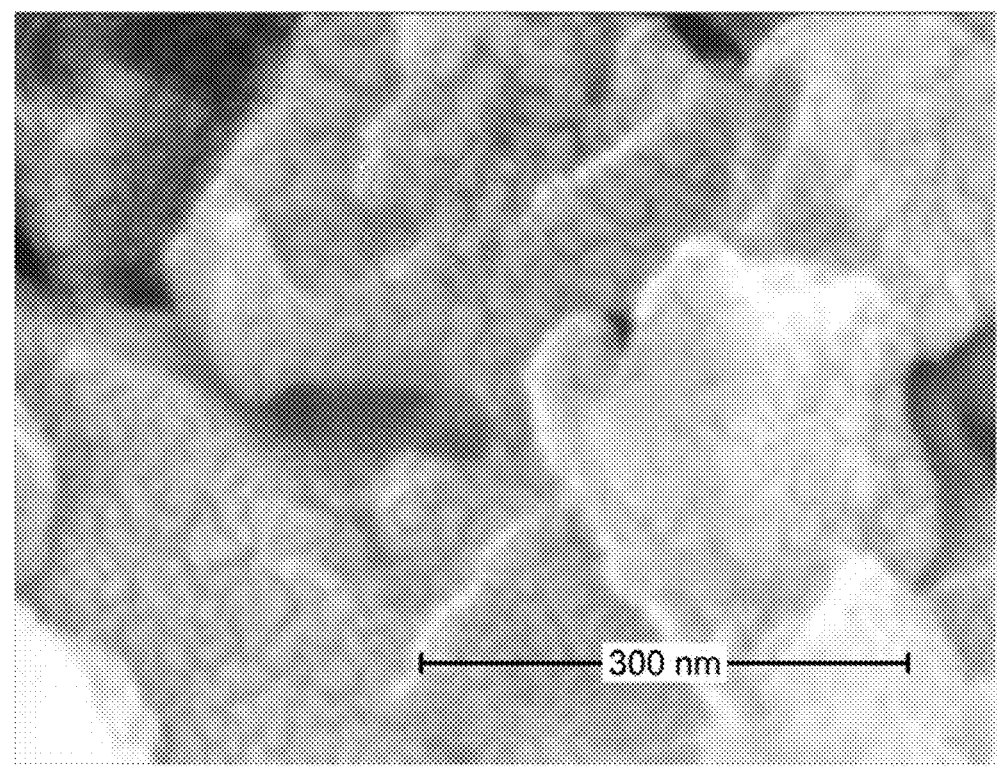
FIG. 2B shows a field-emission scanning electron microscopy (FE-SEM) image of $MgAl_2O_4$ NPs, according to certain embodiments.
Figure 2C:
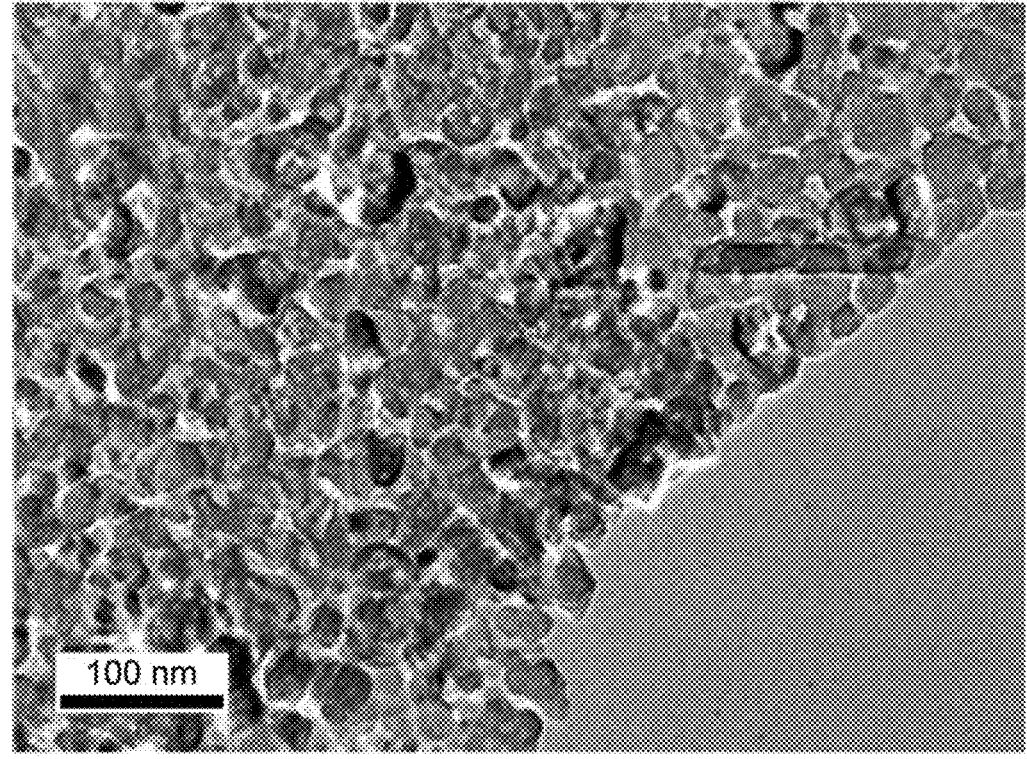
FIG. 2C shows a transmission electron microscopy (TEM) image of $MgAl_2O_4$ NPs at resolution of 100 nanometer (nm), according to certain embodiments.
Figure 2D:
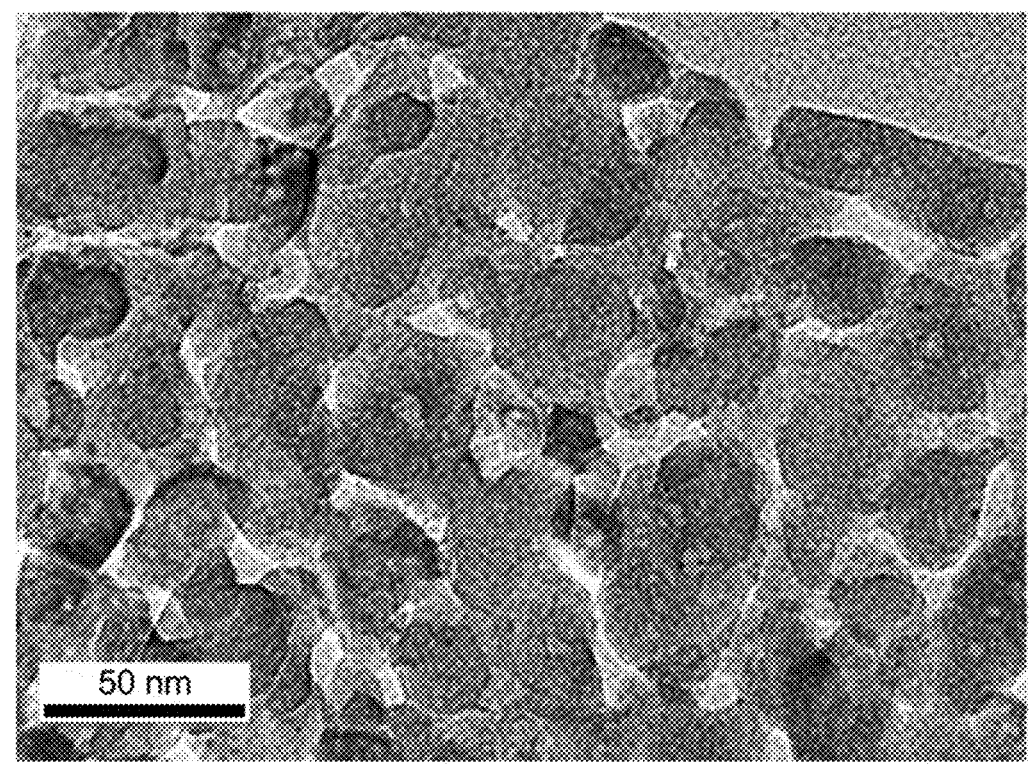
FIG. 2D shows a TEM image of $MgAl_2O_4$ NPs at resolution of 50 nm, according to certain embodiments.
Figure 2E:
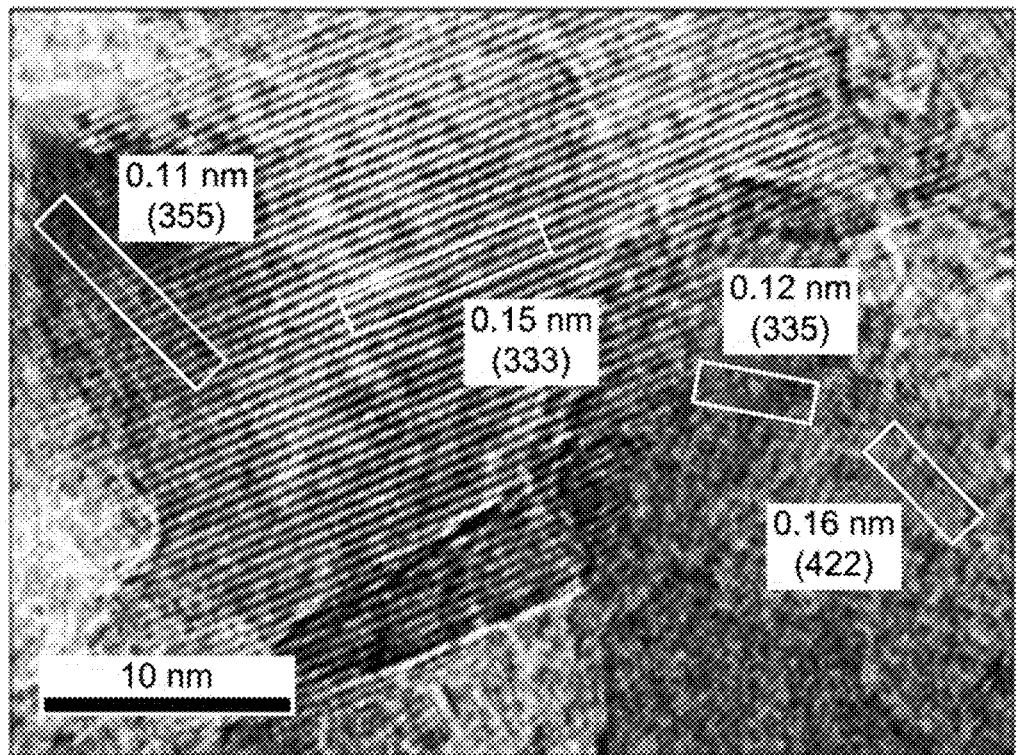
FIG. 2E shows a high-resolution TEM (HR-TEM) image of $MgAl_2O_4$ NPs, according to certain embodiments.
Figure 2F:
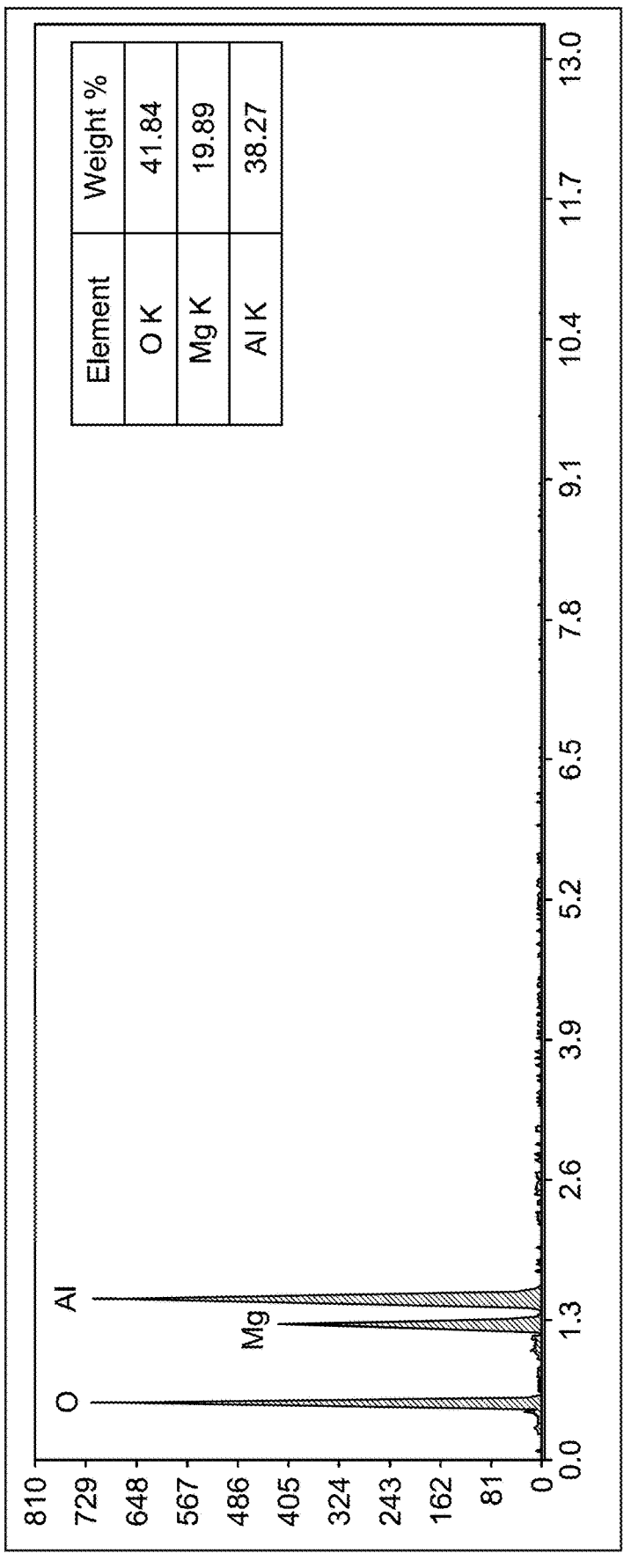
FIG. 2F shows energy dispersive X-ray (EDX) spectrum of $MgAl_2O_4$ NPs, according to certain embodiments.
Figure 2G:
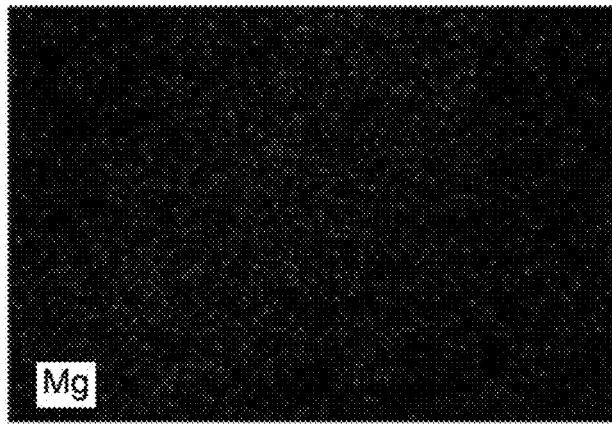
FIG. 2G shows elemental mapping of $MgAl_2O_4$ NPs, according to certain embodiments.
Figure 2G:
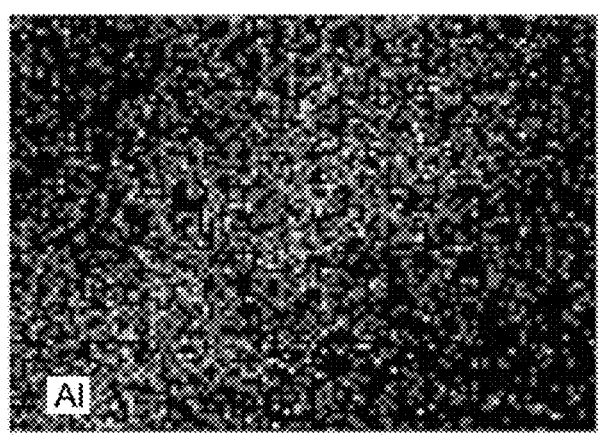
Figure 2G:
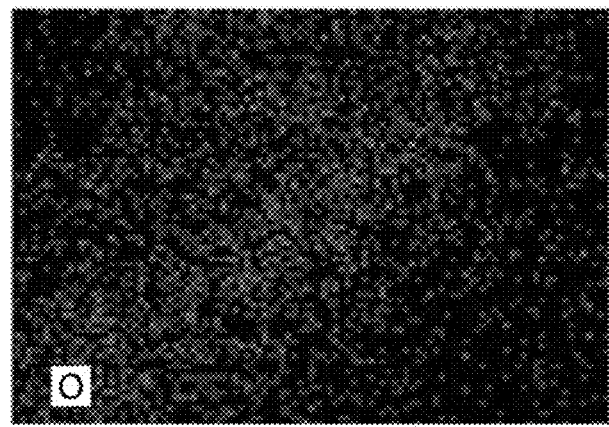

The structure of synthesized $MgAl_2O_4$ NPs were examined using XRD, as shown in FIG. 2A. The Rietveld reference fitting with Match 3! and the FullProf software of the XRD pattern revealed a strong agreement with cubic spinel aluminate, without undesirable impurities. The lattice constants (a=b=c) were determined as 8.0908 Å, and the crystallite size ($D_{XRD}$) was measured as 16.5 nm. The shape of NPs was analyzed using high magnification FE-SEM, which revealed the organization of uniformly small spherical particles, as shown in FIG. 2B. Further examination under two different resolutions of TEM images revealed that the NPs had a tight cluster of spherical particles with a size of around 20 nm, as shown in FIGS. 2C-2D. To validate the presence of the cubic spinel aluminate phase, the d-spacing value of the lattice planes was calculated using GATAN software and HR-TEM images, as shown in FIG. 2E. The EDX investigation confirmed the presence of Al, Mg, and O, suggesting the successful synthesis of $MgAl_2O_4$ NPs, as depicted in the elemental mapping images of FIG. 2F and FIG. 2G.

Figure 3A:
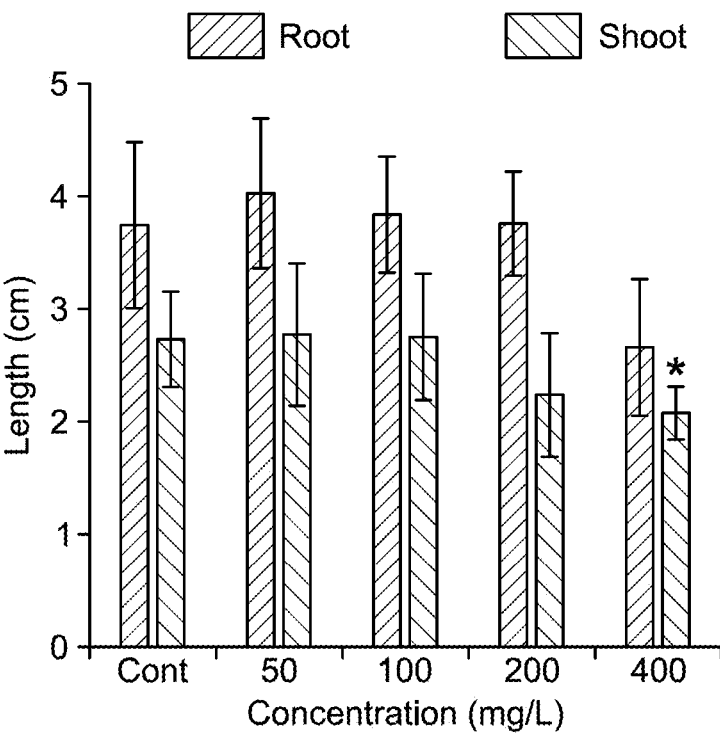
FIG. 3A shows a column graph for the $MgAl_2O_4$ NPs treatment effect on germination and plant growth indices at concentrations of 50 mg/L, 100 mg/L, 200 mg/L, and 400 mg/L and for non-treated barley seedlings, after four days of germination, according to certain embodiments.
Figure 3B:
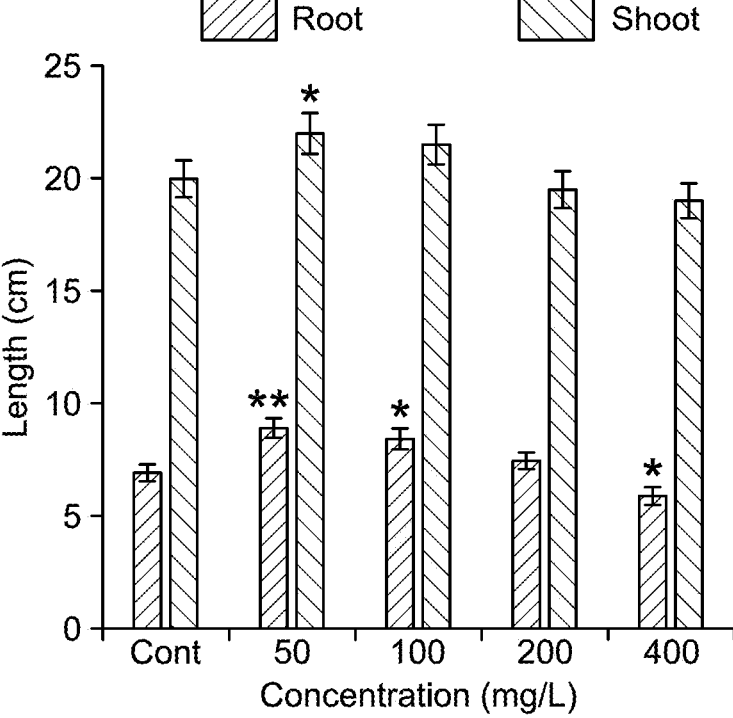
FIG. 3B shows a column graph for the $MgAl_2O_4$ NPs treatment effect on germination and plant growth indices at concentrations of 50 mg/L, 100 mg/L, 200 mg/L, and 400 mg/L and for non-treated barley seedlings, after three weeks of NPs treatment, according to certain embodiments.
Figure 3C:
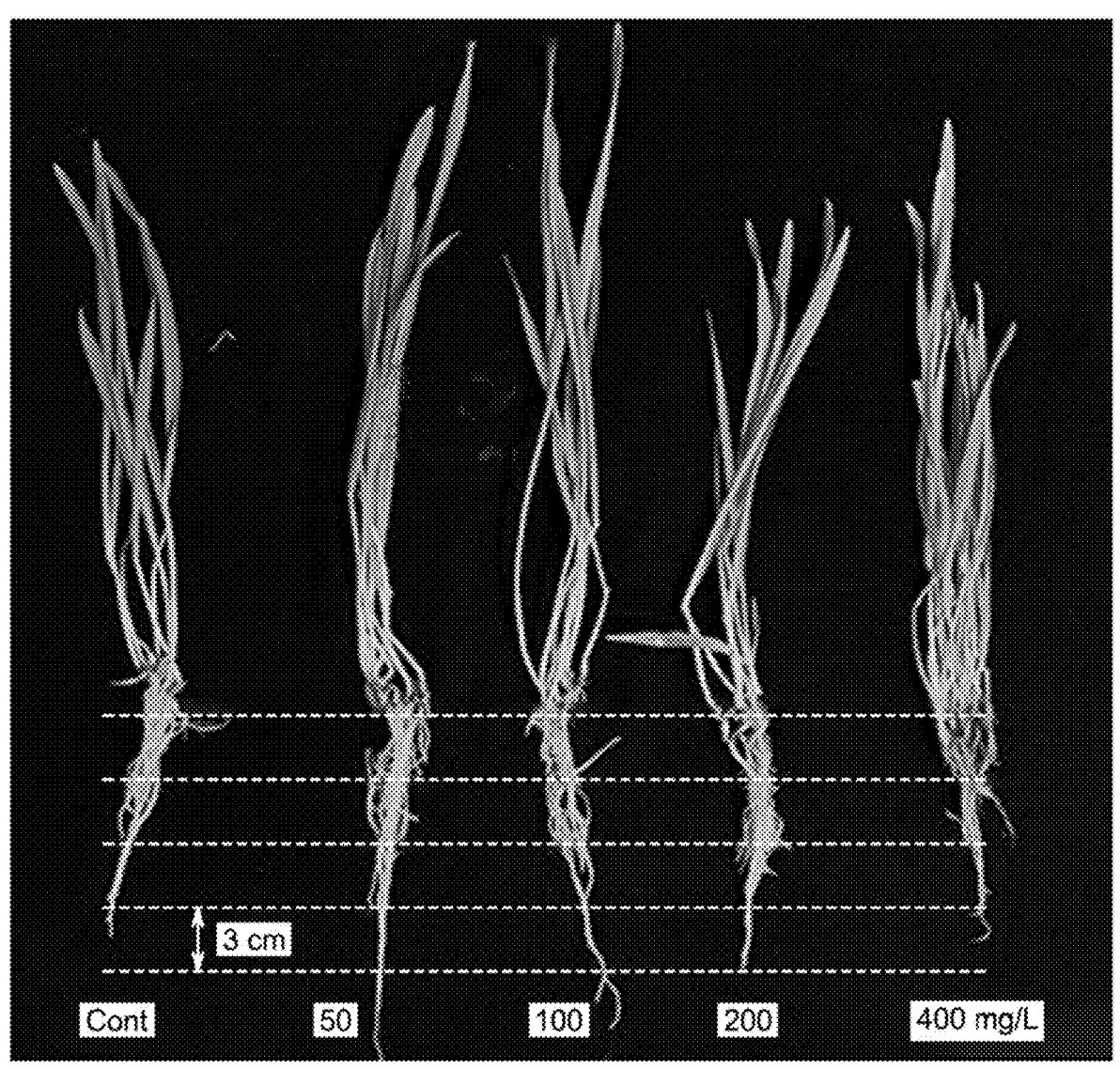
FIG. 3C is a photographic image of plant growth at NP concentrations of 50 mg/L, 100 mg/L, 200 mg/L, and 400 mg/L after three weeks of exposure to $MgAl_2O_4$ NPs treatment, according to certain embodiments.

The physiological effects of $MgAl_2O_4$ NPs on barley plants were assessed, particularly focusing on seed germination and plant growth indices. Exposure to low concentrations of 50 mg/L $MgAl_2O_4$ NPs resulted in a significant enhancement in both leaf and root lengths, with the observed improvement being statistically significant ($p<0.05$). However, a noticeable decrease in growth was observed at higher nanoparticle (NP) dosages, particularly at 400 mg/L, with a decline starting from the 100-200 mg/L concentrations. The observed pattern was consistently seen during the germination and growth stages, as shown in FIGS. 3A-3E. The plants exhibited the most significant growth improvement at 50 mg/L and 100 mg/L doses after three weeks of NPs administration, for which the root length increased by approximately 46% (50 mg/L; $p<0.01$) and 30% (100 mg/L; $p<0.05$) respectively as compared to the control and as shown in FIG. 3B. The shoots showed a similar growth pattern, where the growth improvement was approximately (~) 10% more in the 50 mg/L group than the control one, as shown in FIGS. 3B-3C.

Figure 3D:
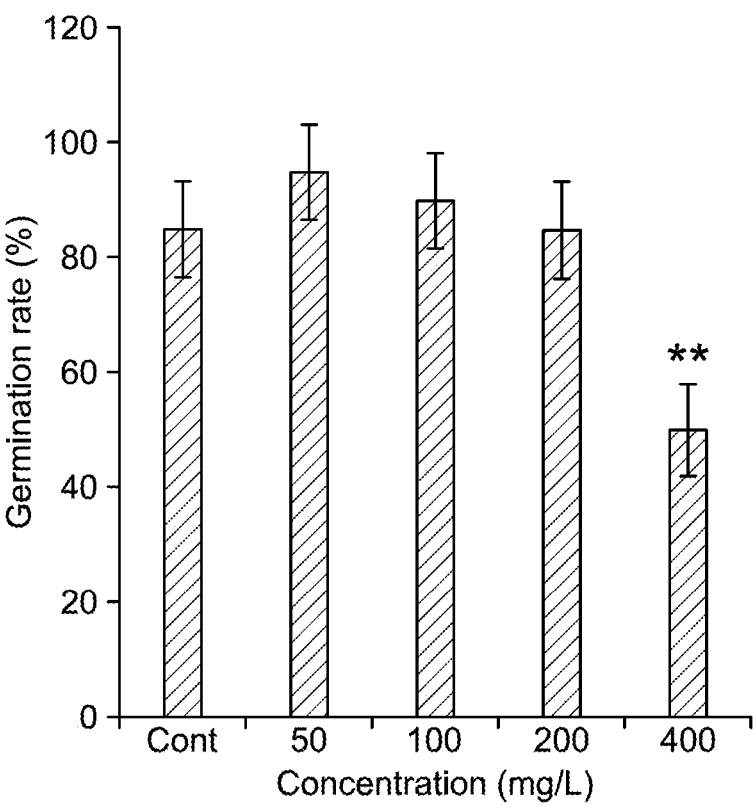
FIG. 3D shows a column graph illustrating germination ratio (%) under $MgAl_2O_4$ NPs treatment, according to certain embodiments.

In the same way, compared to the control, the treatment with $MgAl_2O_4$ NPs at a concentration of 50 mg/L increased the germination ratio, but this increase was not statistically significant ($p>0.05$). Subsequently, there was an observed decline in the germination ratio as the concentrations of NPs increase, as seen in FIG. 3D. At 400 mg/L, the germination rate was 41% lower than that of the control. The germination results suggest $MgAl_2O_4$ NPs' positive impact on growth indices at low concentration (50 mg/L), while presenting a potentially toxic effect at much higher doses (400 mg/L). Concurrently with the findings of present disclosure, an examination [See: Ahmed B., Khan M. S. and Musarrat J., Toxicity assessment of metal oxide nano-pollutants on tomato (*Solanum lycopersicon*): A study on growth dynamics and plant cell death, Environmental Pollution, 240:802-816 (2018), the disclosure of which is incorporated herein by reference in its entirety/revealed that 2,000 mg/L $Al_2O_3$ NPs treatment increased root and shoot length in *Solamim lycopersicon* plants. Additionally, it has been demonstrated that the harmful impacts of nano-$Al_2O_3$ were directly influenced by the dosage administered. A positive impact was noted at a dosage of 50 mg/mL. The utilization of $Al_2O_3$NPs resulted in the suppression of root elongation and reduction in total protein content, and fragmentation of DNA [See: Yanuk, F., et al., *Oxidative stress response to aluminium oxide ($Al_2O_3$)* nanoparticles in Triticum aestivum, Biologia, 73 (2): 129-135 (2018), the disclosure of which is incorporated herein by reference in its entirety]. Another analysis [See: Asztemborska M. et al., Accumulation of Aluminium by Plants Exposed to Nano-and Microsized Particles of Al₂O₃, Asztemborska 9(1): 109-116 (2015), the disclosure of which is incorporated herein by reference in its entirety] found similar results, showing that Allium cepa L., Zea mays, Lepidium sativum, and Kalanchoe daigremontiana experienced an increase in plant biomass when exposed to low concentrations of Al₂O₃ NPs. However, researchers observed a 33% decrease in root dry mass at the highest used concentration of Al₂O₃NPs (1,000 milligrams per kilograms (mg/kg)). Additionally, analysis by [See: Juhel G. et al., Alumina nanoparticles enhance growth of Lemna minor, Aquatic Toxicology, 105 (3-4): 328-336 (2011), the disclosure of which is incorporated herein by reference in its entirety/ found that Lemna minor biomass was significantly enhanced by Al₂O₃ NPs. Nevertheless, that growth enhancement decreased with increasing NPs concentrations beyond 1,000 mg/L. A further examination found that all growth features were positively impacted by seed-priming with 0.01% Al₂O₃ NPs, which had growth-promoting effects. On the other hand, other doses-0.05%, 0.1%, and 0.5%-retarded these qualities in a concentration-dependent manner [See: Abdel Latef et al., The impact of priming with Al₂O₃ nanoparticles on growth, pigments, osmolytes, and antioxidant enzymes of egyptian roselle (Hibiscus Sabdariffa l.) cultivar, Agronomy, 10(5): 681 (2020), the disclosure of which is incorporated herein by reference in its entirety]. According to Yanik et al. above the growth suppression caused by Al₂O₃ NPs may be attributed to cellular damage through oxidative stress, callose deposition, DNA breakage or lignin accumulation. These findings align with the results of this disclosure, as higher doses of MgAl₂O₄ NPs led to a reduction in growth characteristics.

Figure 3E:
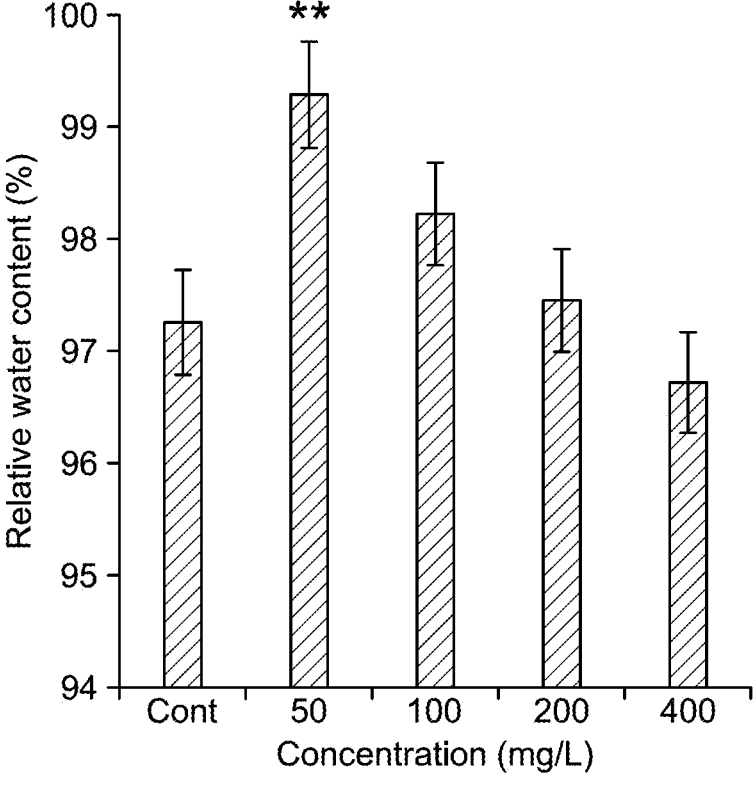
FIG. 3E shows a column graph of the relative water content (RWC) of seedlings treated with $MgAl_2O_4$ NPs at concentrations of 50 mg/L, 100 mg/L, 200 mg/L, and 400 mg/L, according to certain embodiments.

To evaluate the MgAl₂O₄ NPs impacts on the absorption of water by plants, the RWC relative water content (RWC) of barley leaves was determined, as shown in FIG. 3E: it has been considered that NPs may increase plant's water absorption capacity by altering membrane pores or ion channels [See: Zhu, H. et al., Uptake, translocation, and accumulation of manufactured iron oxide nanoparticles by pumpkin plant, Journal of Environmental Monitoring 10 (6): 713-717 (2008), the disclosure of which is incorporated herein by reference in its entirety]. The findings of FIG. 3E indicate a dramatic increase in RWC at 50 mg/L treatment (about 47%; p<0.01), while a gradual drop in RWC was obvious as the concentration of NPs increased. The increase in RWC suggested that plants treated with NPs (i.e., 50 mg/L) may have experienced changes in their membrane and ion channel functioning, resulting in an enhanced water uptake. However, NPs at high concentrations (>100 mg/L) may accumulate on root surfaces and disrupt cell membrane channels and pores, thus inhibiting water transport. The decrease can be attributed to a possible blockage of apoplast, which might reduce nutrient and water absorption [See: Yuan, J. et al., New insights into the cellular responses to iron nanoparticles in Capsicum anmuum, Scientific Reports, 8 (1): 3228 (2018)]. Damage or deformation to vascular bundles because of the high dose action of NPs is another potential cause of the growth reduction. Furthermore, the production and buildup of hydroxyl (OH) radicals, which promote cell wall permeabilization and cell elongation, could be a contributing factor to the expansion of plant biomass [See: Yuan, J. et al., New insights into the cellular responses to iron nanoparticles in Capsicum anmum, Scientific Reports 8

(1): 3228 (2015), the disclosure of which is incorporated herein by reference in its entirety].

The physiological indicators showed that low MgAl₂O₄ NPs' concentrations enhanced the growth parameters of barley, including the germination rate and the growth of both roots and shoots during the germination for 4 days and development for three weeks stages. The outcomes indicated 50 mg/L of MgAl₂O₄ NPs may promote the growth of barley seedlings. Nevertheless, there was no noticeable alteration in the growth enhancement at a concentration of >200 mg/L of NPs. In contrast, higher concentrations led to a decrease in the growth indices, suggesting NPs toxic effect.

Photosynthesis is often regarded as a reliable indicator for evaluating the overall efficiency of plants [See: Kalaji, H. M. et al., Frequently asked questions about in vivo chlorophyll fluorescence: Practical issues, Photosynthesis Research 122 (2): 121-158 (2014), the disclosure of which is incorporated herein by reference in its entirety]. As the sole energy entrance point in plants, it also functions as a sensor to comprehend plant metabolism and physiology. Hence, assessing the levels of photosynthetic pigment and activity is a reliable indicator to showcase the impact of stressors on the plant [See: Rastogi, A. et al., Impact of Metal and Metal Oxide Nanoparticles on Plant: A Critical Review, Frontiers in Chemistry, 5 (2017), the disclosure of which is incorporated herein by reference in its entirety]. The relationship between the concentration of MgAl₂O₄ NPs and the status leaf pigments, including chlorophyll-a and -b, carotenoids, and total pigments, is shown in FIGS. 4A-4B. The analysis of all pigments in the present disclosure revealed consistent graphical patterns. The pigment content in the leaves grew up to a concentration of 50 mg/L (p<0.01), then declined gradually as the concentration of NPs increased. The results aligned with the growth indices, as shown in FIG. 3, indicating a significant contribution of MgAl₂O₄ NPs to plant growth and development at 50 mg/L and a potential toxic effect at higher concentrations. A prior examination showed that the chlorophyll content of Triticum aestivum plants reduced when treated with Al₂O₃ NPs at a concentration of 50 mg/mL for 96 h [See: Yanuk, F. et al., Toxic Effects of Aluminum Oxide (Al₂O₃) Nanoparticles on Root Growth and Development in Triticum aestivum, Water, Air, & Soil Pollution, 226 (9): 296 (2015), the disclosure of which is incorporated herein by reference in its entirety]. In addition, certain authors have observed a reduction in algae's chlorophyll levels when exposed to Al-NPs [See: Sadiq, I. M. et al., Studies on toxicity of aluminum oxide (Al₂O₃) nanoparticles to microalgae species: Scenedesmus sp. and Chlorella sp., Journal of Nanoparticle Research, 13 (8): 3287-3299 (2011), the disclosure of which is incorporated herein by reference in its entirety]. Additionally, Abdel Latef and researchers, 2020, suggested that higher doses of Al₂O₃ NPs caused a decrease in the chlorophyll content in Hibiscus sabdariffa [See: Abdel Latef, A. A. H. et al., The impact of priming with Al₂O₃ nanoparticles on growth, pigments, osmolytes, and antioxidant enzymes of egyptian roselle (hibiscus sabdariffa l.) cultivar, Agronomy 10 (5) (2020), the disclosure of which is incorporated herein by reference in its entirety].

Furthermore, chlorophyll fluorescence qualities—which include electron transport rate (ETR), effective photochemical quantum yield of photosystem II (Y(II), and the maximal quantum efficiency of PSII (Fv/Fm)—were also investigated, as shown in FIGS. 4C-4E. The application of 50 mg/L of MgAl₂O₄ NPs treatment resulted in a considerable enhancement of chlorophyll fluorescence indices compared to the control. However, the ETR, Y(II), and Fv/Fm were notably reduced at higher NPs doses including 200 mg/L and 400 mg/L in comparison to control (p<0.01; p<0.005). A prior investigation showed that the quantum yield of photosystem II of *Lemna minor* plants increased when treated with $Al_2O_3NPs$ [See: Juhel, G. et al., *Alumina nanoparticles enhance growth of Lemna minor, Aquatic Toxicology* 105 (3-4): 328-336 (2011), the disclosure of which is incorporated herein by reference in its entirety]. The findings are in line with the growth indices and pigment contents, as shown in FIG. 3. In the present disclosure, the photosynthetic parameters and activity of barley was influenced by $MgAl_2O_4$ NPs depending on concentration. The results indicated that NPs at low concentrations may play a role in the pigmentation of barley plants. The improvement may be attained by incorporating $MgAl_2O_4$ NPs or their dissociated elemental form into metabolic processes or structures, such as photosynthetic enzymes/reactions and chlorophyll. For instance, Mg plays a crucial role in photosynthetic $CO_2$ assimilation since it is a basic component of chlorophyll pigments in the light-capturing complex of chloroplasts [See: Cakmak, I. et al., *Role of magnesium in carbon partitioning and alleviating photooxidative damage, Physiologica Plantarum,* 133 (4): 692-704 (2008), the disclosure of which is incorporated herein by reference in its entirety]. However, at high doses, the NPs led to a reduction of pigment contents, which may be attributed to the imbalance in nutrition or disruption of the membrane pores, ion channels, and eventually the nutritional trafficking.

Further, to determine possible damage to cell membrane integrity caused by $MgAl_2O_4$ NPs, cell viability in roots was evaluated using the PI-staining method with confocal microscopy, as shown in FIGS. 5A-5F. The spots in the images corresponded to the cell nucleus, which was stained due to damage to the cell membrane. Very few injured cells (spots) were observed in the control, which is expected due to the physiology and aging of the cells, as shown in FIGS. 5A-5D. However, the number of injured cells gradually increased with higher NPs doses and dramatically elevated at the concentration of 400 mg/L, as depicted in FIG. 5E and quantified in FIG. 5F. The results revealed that starting from 50 mg/L, $MgAl_2O_4$ NPs caused cell membrane injury, confirming their harmful effects on plants. The injury was strongly correlated with the dose factor. When the concentration exceeded 400 mg/L, this may have disrupted the integrity of the membrane, demonstrating a detrimental impact on plant cells. The effect may be attributed to the blockage of membrane pores by NPs, interfering with nutrient and water trafficking, and the generation of reactive oxygen species (ROS), which may undermine the integrity of the cell membrane. The examination aligned with the observed growth indices and photosynthesis and pigmentation traits in plants.

SEM analysis was conducted to identify any alterations in the morphology of roots, as shown in FIGS. 6A-6P. SEM images of (a) unexposed (control) and (b, c, d) 50, 100, and 400 mg/L $MgAl_2O_4$ NPs-treated root were prepared at three different resolutions to highlight the damage caused by the NPs. The enlarged image of each test group was displayed on the right-hand side of each figure. No abnormalities in root morphology were seen in the control group, as shown in FIG. 6A. However, utilizing $MgAl_2O_4$ NPs at concentrations exceeding up to 400 mg/L resulted in noticeable fractures and deformations in structures, potentially affecting the physiology, growth, and nutrient absorption of the seedlings. The deformations showed that barley roots were damaged, and cell viability is negatively affected. Conversely, plant growth may be stimulated by limited root damage that improves nutrient absorption. As an example, certain authors have demonstrated that iron (Fe)-based nanocomposite caused growth inhibition at higher concentrations of 200 mg/L, 400 mg/L, and 800 mg/L [See: Tombuloglu, G. et al. (2024) '*Impact of sonication time in nanoparticle synthesis on the nutrition and growth of wheat (Triticum aestivum L.) plant*', *Plant Nano Biology,* 8 (April), p. 100075 (2024), the disclosure of which is incorporated herein by reference in its entirety]. The toxic effect may be ascribed to the disturbance of tissue structure and damage to the cell membrane, resulting in imbalanced nutrition transport. However, plant growth and the absorption of nutrients such as potassium (K), calcium (Ca), magnesium (Mg), Fe, manganese (Mn), zinc (Zn), and boron (B) were improved when a lower dosage of 50 mg/L was used. The present disclosure corroborated previous evaluations that NPs may alter nutrition and water transport by damaging cell membranes when NPs come into contact with membranes. NPs at low concentrations can enhance nutrient uptake and growth in plants.

The ICP-OES analysis was employed to elucidate the route of NPs in the plant body and their impact on the nutrient content and the levels of macro- and micro-elements in the tissues. The concentrations of Al, including micro-elements Mn, Zn, Fe, Cu, B, and macro-elements Ca, K, and Mg in the roots and leaves, are listed in Tables 1 and 2 hereinbelow. In distilled water (DW), the control root content of Mg and Al was approximately 1.74 mg/kg and 0.25 mg/kg, respectively. The addition of NPs steadily raised the quantities of the elements, resulting in approximately 5 to 17 times higher in the plants treated with 400 mg/L NPs compared to the control group, respectively. Typically, the rate of increase is directly proportional to the amount of NPs dosage applied, and this pattern is consistent across all tested constituents.

Furthermore, the concentrations of Mg and Al in the leaves exhibited a considerable increase following the application of 50 mg/L of NPs. The leaf control contained 11.58 mg/kg of Mg and 0.31 mg/kg of Al in DW. At a dosage of 50 mg/L, the concentration of the elements in distilled water was 19.53 mg/kg and 1.50 mg/kg, respectively. The increase was observed approximately 1 and 5 times, respectively, compared to the control level. Compared to the 50 mg/L, the elevated concentrations of NPs, which includes 100 mg/L, 200 mg/L, and 400 mg/L and did not significantly impact the abundance of these components in the leaves. The evaluations indicated that barley roots absorb $MgAl_2O_4$ NPs effectively and transport them to the leaves.

The enhanced absorption of several elements contributed to the improved growth of barley seedlings following treatment with NPs. The treated seedlings showed increased levels of essential nutrients, including K, Ca, Mg, Fe, Cu, and B, in both the roots and leaves (P<0.005), as detailed in Tables 1 and 2. The introduction of $MgAl_2O_4$ NPs in plants effectively addressed deficiencies in Mg and Al, which are vital for optimal growth and development. A possible explanation for this significant increase may be damage to the cell membrane, which houses the plant's selective ion transporters. Confocal microscopy and SEM analyses, as shown in FIGS. 4 and 5, revealed that disruption of cell membrane integrity may result in imbalances in ion and element trafficking, thereby affecting the absorption and distribution of nutrients within the tissues. In line with our findings, previous studies reported that 0.4 mg/mL $\gamma$-$Al_2O_3NPs$ significantly increased *Lactuca sativa* biomass by enhancing the uptake of Ca, Mg, and P. [See: Hayes, K. L. et al., *Effects, uptake, and translocation of aluminum oxide nanoparticles*

*in lettuce: A comparison study to phytotoxic aluminium ions, Science of the Total Environment* 719:137393 (2020), the disclosure of which is incorporated herein by reference in its entirety]. Therefore, several factors, such as the size, shape, geometry, surface area, and aspect ratio of NPs, significantly influence their translocation within plants. Other critical aspects that affect the overall development of plants include the plant species, environmental pH, NP aggregation, their dissolution potential, and interactions with biomolecules. Cellular components that act as barriers, such as membranes, Casparian strips, vascular bundles, and cell walls, may play a key role in controlling or limiting the translocation of NPs and nutrient elements throughout the plant.

ducted to assess the genotoxic effects of $MgAl_2O_4$ NPs. This method allowed for a rapid comparison of genomic DNA banding patterns between control and exposed samples. The comparison involved observing band intensity and the appearance or disappearance of bands, as shown in FIG. 7. The evaluations indicated that $MgAl_2O_4$ NPs caused genotoxic effects at treatment concentrations of 200 mg/L and 400 mg/L, which were linked to a reduction in the number of normal bands, as listed in Table 3. This reduction may be attributed to point mutations and the expression of genomic instabilities, such as point mutations, gene and chromosome rearrangements, deletions, and insertions [See: Atienzar, F.

TABLE 1

| | | Microelements | | | | | |
|---|---|---|---|---|---|---|---|
| Tissue | Sample (mg/L) | Mn (mg/kg DW) | Zn (mg/kg DW) | Fe (mg/kg DW) | Cu (mg/kg DW) | B (mg/kg DW) | Al (mg/kg DW) |
| Root | Control | 0.069 ± 0.0006 | 0.033 ± 0. 0.0003 | 0.28 ± 0.0036 | 0.012 ± 0.0002 | 0.002 ± 0.0000 | 0.253 ± 0.0271 |
| | 50 | 0.101 ± 0.0017*** | 0.06 ± 0.003*** | 0.82 ± 0.0043*** | 0.012 ± 0.0006 | 0.026 ± 0.0004*** | 2.202 ± 0.0933*** |
| | 100 | 0.072 ± 0.0009 | 0.046 ± 0.0018** | 0.39 ± 0.0057*** | 0.008 ± 0.0004** | 0.009 ± 0.0003*** | 0.565 ± 0.0143*** |
| | 200 | 0.097 ± 0.0017*** | 0.043 ± 0.0005** | 0.446 ± 0.0026 | 0.01 ± 0.0006 | 0.013 ± 0.0002*** | 0.612 ± 0.0249*** |
| | 400 | 0.157 ± 0.0039*** | 0.082 ± 0.00134*** | 0.850 ± 0.0313*** | 0.03 ± 0.0003*** | 0.039 ± 0.0004*** | 4.386 ± 0.0384*** |
| Leaf | Control | 0.0114 ± 0.0033 | 0.152 ± 0.003 | 0.38 ± 0.0029 | 0.037 ± 0.0008 | 0.046 ± 0.00 | 0.313 ± 0.018 |
| | 50 | 0.142 ± 0.0029*** | 0.224 ± 0.0006*** | 0.679 ± 0.0177*** | 0.042 ± 0.0001* | 0.1290 ± 0.0015*** | 1.503 ± 0.0148*** |
| | 100 | 0.174 ± 0.0016*** | 0.1870 ± 0.0026** | 0.889 ± 0.0200*** | 0.037 ± 0.0006 | 0.142 ± 0.0017*** | 0.751 ± 0.0113*** |
| | 200 | 0.195 ± 0.00063 | 0.209 ± 0.0016*** | 0.629 ± 0.0075 | 0.048 ± 0.0006** | 0.155 ± 0.0018*** | 0.732 ± 0.0361*** |
| | 400 | 0.147 ± 0.0018*** | 0.156 ± 0.0013 | 0.511 ± 0.0061** | 0.05 ± 0.0005*** | 0.139 ± 0.0026 *** | 1.434 ± 0.0606*** |

⚜ Contents of microelements (mg/kg in DW) in leaves tissues for NPs-treated (50, 100, 200, and 400 mg/L) and untreated (control) samples.
The asterisk (*) symbol denotes a significant difference between treatment and control (***P < 0.005).

TABLE 2

| | | Macroelements | | |
|---|---|---|---|---|
| Tissue | Sample | Ca (g/kg DW) | K (g/kg DW) | Mg (g/kg DW) |
| Root | Control | 14.01 ± 0.2710 | 10.22 ± 0.0460 | 1.746 ± 0.023 |
| | 50 mg/L | 30.23 ± 0.3260*** | 21.79 ± 0.362*** | 6.43 ± 0.0636*** |
| | 100 mg/L | 14.01 ± 0.1190 | 11.99 ± 0.257* | 2.792 ± 0.0486*** |
| | 200 mg/L | 12.30 ± 0.0620* | 17.17 ± 0.3090*** | 2.877 ± 0.0329*** |
| | 400 mg/L | 31.63 ± 1.119*** | 35.88 ± 0.936*** | 9.098 ± 0.0928*** |
| Leaf | Control | 51.84 ± 1.156 | 176.5 ± 2.32 | 11.58 ± 0.164 |
| | 50 mg/L | 71.23 ± 1.33*** | 224.3 ± 2.63*** | 19.53 ± 0.317*** |
| | 100 mg/L | 82.5 ± 0.711*** | 219.1 ± 1.35*** | 20.79 ± 0.201*** |
| | 200 mg/L | 73.67 ± 2.833*** | 230.8 ± 3.06*** | 24.41 ± 0.212*** |
| | 400 mg/L | 53.84 ± 0.3060 | 204.4 ± 1.130*** | 19.32 ± 0.466*** |

⚜ Contents of macroelements (g/kg in DW) in leaves tissues for NPs-treated (50 mg/L, 100 mg/L, 200 mg/L, and 400 mg/L) and untreated (control) samples.
The asterisk (*) symbol denotes a significant difference between treatment and control (***p < 0.005).

Further, understanding the genotoxic effects of NPs was crucial before their widespread use, despite their ability to enhance plant germination and growth performance. The genotoxic effects of toxicants encompass various phenomena, including DNA alterations, DNA damage, genetic instability, and mutagenesis. A RAPD-PCR analysis was conducted to assess the genotoxic effects of A. et al., *The random amplified polymorphic DNA (RAPD) assay and related techniques applied to genotoxicity and carcinogenesis studies: A critical review, Mutations Research—Reviews in Mutation Research* 613 (2-3): 76-102 (2006), the disclosure of which is incorporated herein by reference in its entirety].

TABLE 3

| NP concentrations | Total bands | a | b | c | d |
|---|---|---|---|---|---|
| Control | 8 | — | — | — | — |
| 50 mg/L | 8 | 2 | 2 | 3 | 2 |
| 100 mg/L | 8 | 2 | 2 | 2 | 1 |
| 200 mg/L | 7 | 1 | 2 | 3 | 1 |
| 400 mg/L | 6 | 3 | 3 | 1 | 2 |

For the DNA-polymerase chain reaction (RAPD-PCR, Marker M, 100 bp) profiles of $MgAl_2O_4$ NPs-treated and untreated control barley roots: a, indicates the appearance of new bands; b, indicates the disappearance of bands; c, indicates a decrease in band intensity; and d, indicates an increase in band intensity.

The RAPD-PCR technique was helpful in genotoxicity examinations, as it may precisely identify DNA damage. The RAPD-PCR technique did not require prior genomic information and used random primers including DNA template sequences [See: Hassan G H, et al., *Cytogenotoxicity evaluation of water contamination with some texlle azo dyes using RAPD marker and chromosome aberration of onion (Allium cepa) root cell, Egypt J. Genrt Cyto* 43:39-57 (2014), the disclosure of which is incorporated herein by reference in its entirety]. The technique may identify DNA damage and detect changes induced by exposure to toxic compounds. The evaluations of the present disclosure confirmed that treatment with 200 mg/L and 400 mg/L of $MgAl_2O_4$ NPs caused genotoxic effects, which were associated with the disappearance and alteration of band patterns. The loss of bands may be attributed to a reduction in the number of polymerase binding sites, as well as mutations or damage occurring at the primer binding site on the DNA strand. Additionally, this loss may have resulted from chromosomal rearrangements, point mutations, DNA damage, or the addition or deletion of nitrogenous base sequences in the DNA strands, all of which were influenced by genotoxic effects [See: Yumis M. Y., et al., *In vitro mutagensis of Etlingera elatior (Jack) and early detection of mutation using RAPD markers, Turk. J. Biol.,* 37:716-725 (2013), the disclosure of which is incorporated herein by reference in its entirety].

To conclude, the present disclosure models the influence of a potential nanofertilizer ($MgAl_2O_4$) containing two essential plant nutrients (Mg and Al) on barley (*Hordeum vulgare* L.). Nanoparticles (NPs) of $MgAl_2O_4$ were first synthesized and the structural and morphological properties were analyzed. Their impact on plant nutrition, physiology, growth, and genotoxicity were elucidated. The findings demonstrated that the concentrations of NPs influence the biomineralization and biomass of barley plants. Furthermore, the NPs have a dual effect as they can promote plant growth but also exhibit toxicity at elevated doses, necessitating prudent utilization. The results confirmed that increasing the concentration of NPs in the medium causes a more significant buildup of metals, which are then transported to the upper parts of the plant. Moreover, the modelled NPs may have a genotoxic impact at higher doses. Therefore, nanofertilizer applications must be carried out carefully. In addition to their benefits to plant growth, their potential toxic effects must be assessed. Overall, it is imperative to acknowledge the potential harm of nanofertilizers to the environment, as their toxicity cannot be disregarded.

Numerous modifications and variations of the present disclosure are possible in light of the above teachings. Therefore, it is to be understood that within the scope of the appended claims, the invention may be practiced other than as specifically described herein.

The invention claimed is:

1. A method of increasing at least one of the chlorophyll-a concentration and the chlorophyll-b concentration in the leaves of a plant of the genus *Hordeum* which has been hydroponically grown from seed over a duration of from about 2 to about 4 weeks, the method comprising:

germinating the seed at a temperature of from about 20 to about 40° C.;

transferring the germinated seed into an aqueous hydroponic dispersion having a temperature of from about 20° C. to about 40° C., wherein the aqueous hydroponic dispersion comprises nanoparticles of magnesium aluminate ($MgAl_2O_4$) at a concentration of from about 20 to about 200 mg/L and further wherein $MgAl_2O_4$ has a cubic spinel structure, as determined by X-ray diffraction (XRD);

for the duration of about 2 to about 4 weeks after the transferring, maintaining the aqueous hydroponic dispersion at a temperature of from 20 to about 40° C. and subjecting the aqueous hydroponic dispersion to dark period-to-light period cycling, wherein each dark period is of x hours, each light period is of (24-x) hours and x is from about 6 to about 12; and, for the duration of about 2 to about 4 weeks after the transferring, periodically adding nanoparticles of $MgAl_2O_4$ to the aqueous hydroponic dispersion to maintain the concentration of the nanoparticles in the aqueous hydroponic dispersion at from about 20 to about 200 mg/L, wherein the periodically added $MgAl_2O_4$ has a cubic spinel structure, as determined by X-ray diffraction (XRD).

2. The method according to claim 1, wherein the plant is selected from the group consisting of: *Hordeum vulgare; Hordeum spontaneum; Hordeum jubatum; Hordeum pussilum; Hordeum bulbosum; Hordeum murinum; Hordeum deficiens; Hordeum distichon; Hordeum hexastichon; Hordeum zeocriton; Hordeum trifurcatum; Hordeum intermedium*; and, combinations thereof.

3. The method according to claim 1, wherein the plant is *Hordeum vulgare*.

4. The method according to claim 1 further comprising priming the seed prior to the germinating thereof, wherein priming comprises the controlled hydration of the seed to induce pre-germination metabolic processes in the seed.

5. The method according to claim 1, wherein germinating comprises at least one process selected from the group consisting of: soil planting the seed; disposing the seed on a water-impregnated material; water soaking of the seed; stratification of the seed; and, scarification of the seed.

6. The method according to claim 1, wherein germinating comprises disposing the seed on a water-absorbent material which permits the penetration of the root of the sprouting seed and impregnating the material with water.

7. The method according to claim 1, wherein the seed is germinated at a temperature of from about 25° C. to about 35° C.

8. The method according to claim 1, wherein the nanoparticles (NPs) of $MgAl_2O_4$ have a median volume particle diameter (Dv50) of from about 10 to about 40 nm, as determined by transmission electron microscopy (TEM).

9. The method according to claim 8, wherein the nanoparticles of $MgAl_2O_4$ have a median volume particle diameter (Dv50) of from about 10 to about 30 nm, as determined by TEM.

10. The method according to claim 8, wherein the nanoparticles of $MgAl_2O_4$ have a Dv90 particle diameter of less than about 50 nm, as determined by TEM.

11. The method according to claim 1, wherein the nanoparticles of $MgAl_2O_4$ have a sphericity of at least about 0.4.

12. The method according to claim 1, wherein the aqueous hydroponic dispersion into which the germinated seeds are transferred comprises nanoparticles of $MgAl_2O_4$ at a concentration of from about 30 to about 150 mg/L.

13. The method according to claim 12, wherein the aqueous hydroponic dispersion into which the germinated seeds are transferred comprises nanoparticles of $MgAl_2O_4$ at a concentration of from about 40 to about 60 mg/L, and wherein maintaining the aqueous hydroponic dispersion at a temperature of from 20 to about 40° C. and subjecting the aqueous hydroponic dispersion to dark period-to-light period cycling, causes leaves formed on a plant of the germinated seed to have a chlorophyll-b concentration of 4.5 to 5.5 μg/ml (FW) and a carotenoid pigment concentration of 4.5 to 5.5 μg/ml (FW).

14. The method according to claim 12, wherein the aqueous hydroponic dispersion into which the germinated seeds are transferred comprises nanoparticles of $MgAl_2O_4$ at a concentration of from about 30 to about 90 mg/L.

15. The method according to claim 1, wherein upon transferring the germinated seed, the aqueous hydroponic dispersion is subjected to sonication to obviate aggregation of the NPs of $MgAl_2O_4$.

16. The method according to claim 1, wherein for the duration of about 2 to about 4 weeks after the transferring, the hydroponic dispersion is maintained at a temperature of from about 20° C. to about 30° C.

17. The method according to claim 1, wherein for the duration of about 2 to about 4 weeks after the transferring, the hydroponic dispersion is maintained in an environment having a controlled relative humidity of from about 50 to about 80%.

18. The method according to claim 1, wherein in the dark period-to-light period cycling, x is from about 6 to about 10.

19. The method according to claim 1, wherein in the dark period-to-light period cycling, x is from about 7 to about 9.

20. The method according claim 1, wherein the aqueous dispersion is subjected to sonication after each periodic addition of the nanoparticles of $MgAl_2O_4$ in order to obviate the aggregation thereof.

\* \* \* \* \*